(12) United States Patent
Joo et al.

(10) Patent No.: US 10,903,482 B2
(45) Date of Patent: Jan. 26, 2021

(54) LITHIUM CONTAINING NANOFIBERS

(71) Applicant: CORNELL UNIVERSITY, Ithaca, NY (US)

(72) Inventors: Yong Lak Joo, Ithaca, NY (US); Nathaniel S. Hansen, Portland, OR (US); Daehwan Cho, Ithaca, NY (US); Kyoung Woo Kim, Austin, TX (US)

(73) Assignee: CORNELL UNIVERSITY, Ithaca, NY (US)

( * ) Notice: Subject to any disclaimer, the term of this patent is extended or adjusted under 35 U.S.C. 154(b) by 201 days.

(21) Appl. No.: 15/868,659

(22) Filed: Jan. 11, 2018

(65) Prior Publication Data

US 2018/0130999 A1 May 10, 2018

Related U.S. Application Data

(63) Continuation of application No. 14/382,389, filed as application No. PCT/US2013/028186 on Feb. 28, 2013, now abandoned.

(Continued)

(51) Int. Cl.
*H01M 4/131* (2010.01)
*D01D 5/00* (2006.01)
(Continued)

(52) U.S. Cl.
CPC .............. *H01M 4/131* (2013.01); *C08K 3/22* (2013.01); *D01D 5/003* (2013.01); *D01D 5/0015* (2013.01); *D01F 9/10* (2013.01); *D01F 11/06* (2013.01); *H01M 4/0471* (2013.01); *H01M 4/1391* (2013.01); *H01M 4/505* (2013.01); *H01M 4/525* (2013.01);

*H01M 4/587* (2013.01); *H01M 4/5815* (2013.01); *H01M 4/5825* (2013.01); *H01M 4/602* (2013.01); *H01M 4/604* (2013.01);
(Continued)

(58) Field of Classification Search
None
See application file for complete search history.

(56) References Cited

U.S. PATENT DOCUMENTS 7,326,043 B2   2/2008   Joo et al.
7,901,610 B2   3/2011   Joo et al.
(Continued)

FOREIGN PATENT DOCUMENTS

JP   2008181879   8/2008
JP   2010162685   7/2010
(Continued)

OTHER PUBLICATIONS

International Search Report Form PCT/ISA/220, International Application No. PCT/US2013/028186, pp. 1-13, International Filing Date: Feb. 28, 2013.

(Continued)

*Primary Examiner* — Alix E Eggerding
(74) *Attorney, Agent, or Firm* — Bond, Schoeneck & King, PLLC; Blaine Bettinger

(57) ABSTRACT

Lithium-containing nanofibers, as well as processes for making the same, are disclosed herein. In some embodiments described herein, using high throughput (e.g., gas assisted and/or water based) electrospinning processes produce nanofibers of high energy capacity materials with continuous lithium-containing matrices or discrete crystal domains.

18 Claims, 14 Drawing Sheets

Related U.S. Application Data

(60) Provisional application No. 61/605,937, filed on Mar. 2, 2012, provisional application No. 61/701,854, filed on Sep. 17, 2012.

(51) Int. Cl.

| | | |
|---|---|---|
| *D01F 9/10* | (2006.01) | |
| *H01M 4/505* | (2010.01) | |
| *H01M 4/525* | (2010.01) | |
| *H01M 4/58* | (2010.01) | |
| *H01M 4/587* | (2010.01) | |
| *H01M 4/60* | (2006.01) | |
| *C08K 3/22* | (2006.01) | |
| *D01F 11/06* | (2006.01) | |
| *H01M 4/04* | (2006.01) | |
| *H01M 4/1391* | (2010.01) | |
| *H01M 4/62* | (2006.01) | |
| *H01M 2/16* | (2006.01) | |
| *H01M 4/36* | (2006.01) | |
| *H01M 10/0525* | (2010.01) | |
| *H01M 4/02* | (2006.01) | |
| *B82Y 30/00* | (2011.01) | |

(52) U.S. Cl.
CPC .............. *H01M 4/622* (2013.01); *B82Y 30/00* (2013.01); *C08K 2003/2203* (2013.01); *C08K 2003/2262* (2013.01); *C08K 2003/2289* (2013.01); *C08K 2003/2293* (2013.01); *D10B 2101/02* (2013.01); *D10B 2321/00* (2013.01); *H01M 2/162* (2013.01); *H01M 4/362* (2013.01); *H01M 4/366* (2013.01); *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 2007/0018361 A1* | 1/2007 | Xu | C04B 35/62236 264/465 |
| 2008/0113264 A1* | 5/2008 | Inagaki | H01M 4/485 429/156 |
| 2008/0176139 A1* | 7/2008 | White | H01M 4/131 429/213 |
| 2009/0072780 A1* | 3/2009 | Lee | H01L 31/04 320/101 |
| 2010/0167078 A1 | 7/2010 | Kim et al. | |
| 2012/0028116 A1* | 2/2012 | Choi | H01G 11/34 429/211 |
| 2012/0034512 A1* | 2/2012 | Zhang | B32B 5/26 429/163 |
| 2012/0225358 A1 | 9/2012 | Seo et al. | |

FOREIGN PATENT DOCUMENTS

| | | |
|---|---|---|
| JP | 2011222389 A | 11/2011 |
| KR | 1020100112378 A | 10/2010 |
| WO | 201063244 A2 | 6/2010 |
| WO | 2011068389 A2 | 6/2011 |
| WO | 201100743 | 8/2011 |
| WO | 2013123137 | 8/2013 |

OTHER PUBLICATIONS

U.S. Appl. No. 61/599,541, filed Feb. 16, 2012.

\* cited by examiner

Calcined at 700°*5h (air)

A

B

A

B

C

A

B

C

A

B

C

LITHIUM CONTAINING NANOFIBERS

CROSS-REFERENCE

This application is a Continuation of U.S. Non-Provisional application Ser. No. 14/382,389, filed Sep. 2, 2014, which is a U.S. national phase filing of PCT/US13/28186, filed Feb. 28, 2013, and claims the benefit of U.S. Provisional Application Nos. 61/605,937, filed Mar. 2, 2012, and 61/701,854, filed Sep. 17, 2012, all of which are incorporated herein by reference in their entireties.

BACKGROUND OF THE INVENTION

Batteries comprise one or more electrochemical cell, such cells generally comprising a cathode, an anode and an electrolyte. Lithium ion batteries are high energy density batteries that are fairly commonly used in consumer electronics and electric vehicles. In lithium ion batteries, lithium ions generally move from the negative electrode to the positive electrode during discharge and vice versa when charging. In the as-fabricated and discharged state, lithium ion batteries often comprise a lithium alloy/compound (such as a lithium metal oxide) at the cathode (positive electrode) and another material, such as carbon, at the anode (negative electrode).

SUMMARY OF THE INVENTION

Provided in certain embodiments herein are nanofibers comprising a lithium material. In some embodiments, the nanofibers comprise a continuous matrix or backbone of the lithium material (e.g., does not comprise lithium-containing-nanoparticles or other lithium-containing-domains on or in another continuous matrix material). In specific embodiments, the lithium-containing-continuous matrix or backbone comprises a core matrix material (e.g., the lithium material is not coated on another type of nanofiber). In other embodiments, the lithium-containing-nanofibers comprise non-aggregated lithium-containing-domains embedded within a continuous nanofiber matrix or backbone. In specific embodiments, the continuous nanofiber matrix or backbone comprises or is carbon (e.g., amorphous or amorphous and crystalline carbon). In some embodiments, provided herein are batteries (e.g., lithium-ion batteries) comprising an anode, an electrolyte and a positive electrode (cathode) comprising a plurality of lithium-containing-nanofibers.

In some embodiments, a nanofiber comprising a lithium material comprises a lithium-containing-material represented by the formula: $Li_aM_bX_c$. In some embodiments, M is Fe, Ni, Co, Mn, V, Al, Li, or a combination thereof. In certain embodiments, X is O, $PO_4$, or $SiO_4$. In some embodiments, a is 1-2; b is 0-2; and c is 1-4. In specific embodiments, M is Ni, Co, Mn, or a combination thereof. In further or alternative specific embodiments, X is O. In some specific embodiments, a is 1 and b is 1. In more specific embodiments, a is 1, b is 1, and c is 2. In other specific embodiments, a is 1 and b is 2. In more specific embodiments, a is 1, b is 2, and c is 4. In some embodiments, the lithium-containing-material is $LiCoO_2$, $LiNiO_2$, $LiNi_{0.4}Co_{0.4}Mn_{0.2}O_2$, $LiNi_{1/3}Co_{1/3}Mn_{1/3}O_2$, $LiMn_{1.5}Ni_{0.5}O_4$, or $LiFePO_4$. In other embodiments, the lithium-containing material is $Li_2SO_{y'}$, wherein y' is 0-4. In more specific embodiments, the lithium-containing material is $Li_2S$ or $Li_2SO_4$.

In some embodiments, the nanofiber comprises a $Li_2S$/carbon nanocomposite (e.g., lithium sulfide domains in a continuous carbon matrix) or a $Li_2SO_4$/carbon nanocomposite (e.g., lithium sulfate in a continuous carbon matrix).

In some embodiments, the lithium-containing-material comprises at least 50 wt. % (e.g., at least 80 wt. %) of the nanofiber. In further or alternative embodiments, the nanofiber comprises at least 2.5 wt. % lithium. In further or alternative embodiments, at least 10% (e.g., about 25%) of the atoms present in the nanofiber are lithium atoms.

In some embodiments, the nanofibers provided herein have an initial capacity (e.g., specific, charge or discharge capacity) of at least 60 mAh/g as a positive electrode (cathode) in a lithium ion battery (e.g., at a charge/discharge rate of 0.1 C in a full or half-cell). In specific embodiments, the nanofibers provided herein have an initial capacity of at least 75 mAh/g as a positive electrode (cathode) in a lithium ion battery (e.g., at a charge/discharge rate of 0.1 C in a half-cell). In more specific embodiments, the nanofibers provided herein have an initial capacity of at least 100 mAh/g as a positive electrode (cathode) in a lithium ion battery (e.g., at a charge/discharge rate of 0.1 C in a half-cell). In still more specific embodiments, the nanofibers provided herein have an initial capacity of at least 120 mAh/g as a positive electrode (cathode) in a lithium ion battery (e.g., at a charge/discharge rate of 0.1 C in a half-cell). In yet more specific embodiments, the nanofibers provided herein have an initial capacity of at least 150 mAh/g as a positive electrode (cathode) in a lithium ion battery (e.g., at a charge/discharge rate of 0.1 C in a half-cell). In more specific embodiments, the nanofibers provided herein have an initial capacity of at least 175 mAh/g as a positive electrode (cathode) in a lithium ion battery (e.g., at a charge/discharge rate of 0.1 C in a half-cell).

In some embodiments, nanofibers provided herein have a capacity (e.g., specific, charge or discharge) retention as a positive electrode (cathode) in a lithium ion battery (e.g., at a charge/discharge rate of at least 0.1 C in a full or half-cell) of at least 50% after 50 cycles. In specific embodiments, nanofibers provided herein have a capacity retention as a positive electrode (cathode) in a lithium ion battery (e.g., at a charge/discharge rate of at least 0.1 C in a full or half-cell) of at least 60% after 50 cycles. In more specific embodiments, nanofibers provided herein have a capacity retention as a positive electrode (cathode) in a lithium ion battery (e.g., at a charge/discharge rate of at least 0.1 C in a full or half-cell) of at least 70% after 50 cycles. FIG. 4 and FIG. 13 illustrate capacity retention for various nanofibers provided herein.

Also provided herein are as-spun hybrid nanofibers comprising polymer and a lithium component. In some embodiments, the nanofiber comprises a continuous polymer matrix and a lithium component. In specific embodiments, the polymer matrix comprising a polymer comprising a monomeric repeat unit of ($CH_2$—$CHOM^1$), each $M^1$ being independently selected from H, a lithium ion, and a metal radical; at least 5% of $M^1$ is $Li^+$. In some embodiments, the metal radical is a metal halide, a metal carboxylate, a metal alkoxide, a metal diketone, a metal nitrate, or a combination thereof. In specific embodiments, at least 10% of $M^1$ is $Li^+$. In further or alternative embodiments, at least 10% (e.g., at least 20%, at least 25%, or at least 40%) of $M^1$ is cobalt radical or ion (e.g., —$CoOCOCH_3$). In further or alternative embodiments, at least 10% (e.g., at least 20%, at least 25%, or at least 40%) of $M^1$ is manganese radical or ion (e.g., —$MnOCOCH_3$). In further or alternative embodiments, at least 10% (e.g., at least 20%, at least 25%, or at least 40%) of $M^1$ is nickel acetate (e.g., —$NiOCOCH_3$).

In some embodiments, a nanofiber provided herein has a diameter of less than 1 micron (e.g., less than 500 nm). In further or alternative embodiments, a nanofiber provided herein has an aspect ratio of at least 100 (e.g., at least 1,000, or at least 10,000). In further or alternative embodiments, a nanofiber provided herein has a specific surface are of at least 10 m$^2$/g (e.g., at least 30 m$^2$/g, at least 100 m$^2$/g, at least 300 m$^2$/g, at least 500 m$^2$/g, or at least 1000 m$^2$/g, e.g., as measured by BET). In further or alternative embodiments, a nanofiber provided herein has a length of at least 1 micron (e.g., at least 10 microns, at least 100 microns, at least 1,000 microns).

In some embodiments, a nanofiber provided herein comprises a backbone of a first material, the backbone comprising non-aggregated nanoparticles embedded therein, the nanoparticles comprising a lithium-containing-material. In specific embodiments, the backbone comprises carbon. In specific embodiments, the lithium containing material is represented by the formula: $Li_aM_bX_c$, e.g., wherein a, b, c, M and X are as discussed above.

In some embodiments, provided herein is a lithium-ion battery comprising an anode in a first chamber, a cathode in a second chamber, and a separator between the first chamber and the second chamber, the cathode comprising a plurality of nanofibers of any one of the preceding claims.

In addition, provided herein are processes for producing a lithium-containing-nanofiber, the processes comprising electrospinning a fluid stock to produce a first (as-spun) nanofiber, the fluid stock comprising or prepared by combining a polymer and a lithium salt. In specific embodiments, the first (as-spun) nanofiber is then thermally treated to produce the lithium containing nanofiber. In some embodiments, the electrospinning of the fluid stock is gas assisted (e.g., coaxially—along or around the same axis). In specific embodiments, the polymer is polyacrylonitrile (PAN) (e.g., wherein the fluid further comprises DMF), polyvinyl alcohol (PVA) (e.g., wherein the fluid further comprises water), or a combination thereof. In some embodiments, the fluid stock is aqueous. In certain embodiments, the fluid stock further comprises a non-lithium metal precursor. In specific embodiments, the metal precursor is an iron precursor, a cobalt precursor, an aluminum precursor, a nickel precursor, a manganese precursor, or a combination thereof. In some embodiments, the process comprises thermally treating the first nanofiber at a temperature of at least 300° C. In certain embodiments, the combined concentration of lithium salt and metal precursor is present in or provided into the fluid stock in a concentration of at least 200 mM (e.g., at least 250 mM, or at least 300 mM). In some embodiments, the polymer comprises a plurality of repeating monomeric residues, the combined lithium salt and metal precursor being present in or added in a lithium salt/metal precursor-to-monomeric residue ratio of at least 1:4 (e.g., at least 1:2, or at least 1:1). In some embodiments, the thermally treating step is performed under air—e.g., wherein the process produces a nanofiber comprising a continuous matrix of lithium metal oxide. In some embodiments, the fluid stock further comprises a calcination reagent, such as a non-metal precursor. In specific embodiments, the non-metal precursor is elemental sulfur or a phosphite alkoxide. In some embodiments, the non-metal precursor is elemental sulfur—e.g., for producing lithium containing nanofiber comprising lithium sulfide. In certain embodiments, the non-metal precursor is a phosphite alkoxide—e.g., for producing lithium containing nanofiber comprising lithium metal phosphate.

In certain embodiments, provided herein is a process for producing a lithium-containing-nanofiber, the process comprising:

electrospinning (e.g., gas assisted electrospinning, such as coaxially gas assisted) a fluid stock to produce a first (as-spun) nanofiber, the fluid stock comprising polymer and a plurality of nanoparticles, the nanoparticles comprising a lithium-containing-material; and thermally treating the first nanofiber to produce the lithium containing nanofiber.

Also, provided in certain embodiments herein methods for producing positive electrode, the methods comprising, for example:

a. electrospinning a fluid stock to form nanofibers, the fluid stock comprising a lithium material and a polymer (e.g., a polymer electrospinnable as a melt or in solution—aqueous or solvent based);

b. thermally treating the nanofibers; and c. assembling the nanofibers into an electrode.

Lithium-containing nanofibers described herein are optionally prepared by the first step alone or by the first and second steps.

Further embodiments are also contemplated herein, such as those described in the claims and the detailed description. Moreover, disclosure of a single nanofiber having a given characteristic or characteristics includes disclosure of a plurality of nanofibers having an average of the given characteristic or characteristics. Similarly, disclosure of an average characteristic for a plurality of fibers includes disclosure of a specific characteristic for a single fiber.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
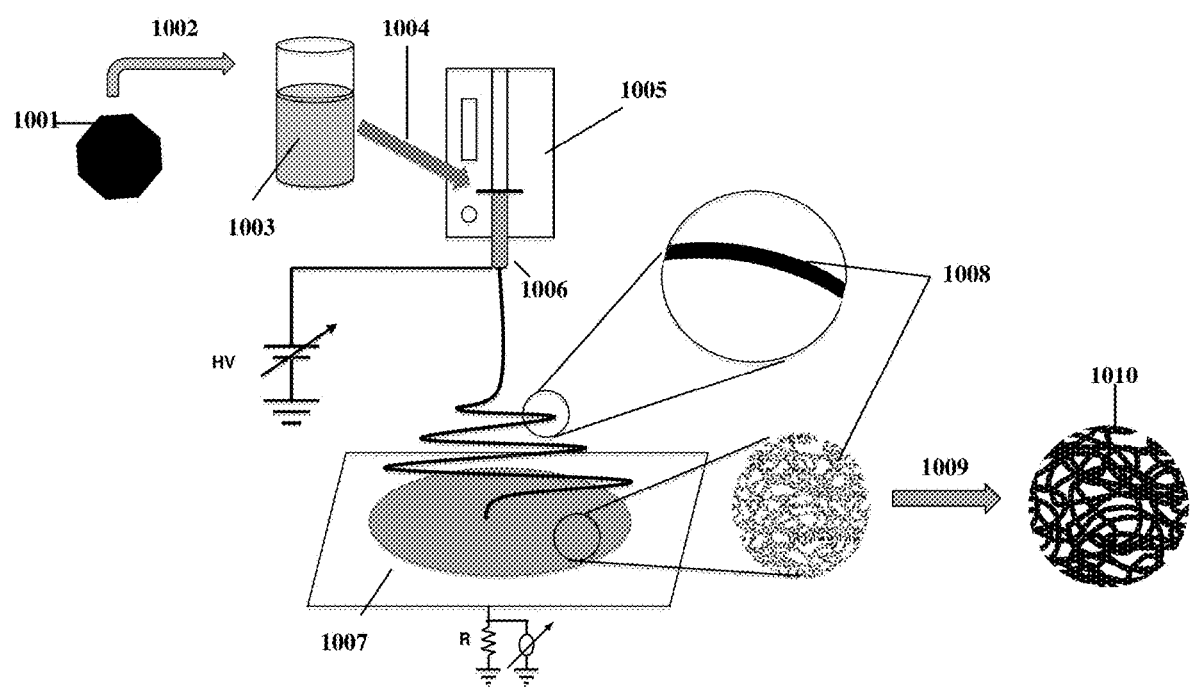
FIG. 1 illustrates one embodiment of the method for producing lithium-containing nanofibers described herein (e.g., suitable for use in lithium ion batteries).

Provided herein are lithium containing nanofibers and nanofiber mats and processes for preparing silicon containing nanofibers and nanofiber mats. Also provided herein are lithium ion batteries comprising such nanofibers (e.g., as the positive electrode or cathode). In some embodiments, a nanofiber (e.g., of a plurality of nanofibers, of a nanofiber mat, or of a process described herein) comprise a lithium material (e.g., a continuous matrix of a lithium material). In certain embodiments, a nanofiber provided herein comprises a first material and a second material, the first material comprising a lithium material. In further embodiments, the first material, the second material, or both form a continuous matrix within the nanofiber. In specific embodiments, both the first and second materials form continuous matrix materials within the nanofiber. In other specific embodiments, the first material comprises a plurality of discrete domains within the nanofiber. In more specific embodiments, the second material is a continuous matrix material within the nanofiber.

Described in certain embodiments herein are batteries (e.g., lithium-ion batteries) comprising an electrode and methods for making a battery (e.g., lithium ion battery) comprising an electrode. In some embodiments, the electrode comprises a plurality of nanofibers, the nanofibers comprising domains of a high energy capacity material. In some embodiments, the electrode comprises porous nanofibers, the nanofibers comprising a high energy capacity material.

Described in certain embodiments herein are batteries (e.g., lithium-ion batteries) and methods for making a battery (e.g., lithium ion battery) comprising a separator. In some embodiments, the battery comprises an anode in a first chamber, a cathode in a second chamber, and a separator between the first chamber and the second chamber. In some embodiments, the separator comprises polymer nanofibers. In some embodiments, the separator allows ion transfer between the first chamber and second chamber in a temperature dependent manner.

In some embodiments, the lithium-ion battery comprises an electrolyte.

Lithium Materials

In some embodiments, the lithium material is any material capable of intercalating and deintercalating lithium ions. In some embodiments, the lithium material is or comprises a lithium metal oxide, a lithium metal phosphate, a lithium metal silicate, a lithium metal sulfate, a lithium metal borate, or a combination thereof. In specific embodiments, the lithium material is a lithium metal oxide. In other specific embodiments, the lithium material is a lithium metal phosphate. In other specific embodiments, the lithium material is a lithium metal silicate. In other specific embodiments, the lithium material is lithium sulfide.

In some embodiments, provided herein is a nanofiber comprising a lithium material (e.g., a continuous core matrix of a lithium material). In some embodiments, the nanofibers comprise a continuous matrix of a lithium material. In certain embodiments, the nanofibers comprises a continuous matrix material (e.g., carbon, ceramic, or the like) and discrete domains of a lithium material (e.g., wherein the discrete domains are non-aggregated). In specific embodiments, the continuous matrix material is a conductive material (e.g., carbon). In further embodiments, provided herein is a cathode (or positive electrode) comprising a plurality of nanofibers comprising a lithium material. In some embodiments, less than 40% of the nanoparticles are aggregated (e.g., as measured in any suitable manner, such as by TEM). In specific embodiments, less than 30% of the nanoparticles are aggregated). In more specific embodiments, less than 25% of the nanoparticles are aggregated). In yet more specific embodiments, less than 20% of the nanoparticles are aggregated). In still more specific embodiments, less than 10% of the nanoparticles are aggregated). In more specific embodiments, less than 5% of the nanoparticles are aggregated).

In some instances, the lithium material is or comprises LiCoO$_2$, LiCo$_{x1}$Ni$_{y1}$Mn$_{z1}$O$_2$, LiMn$_{x1}$Ni$_{y1}$Co$_{z1}$V$_{a1}$O$_4$, Li$_2$S, LiFe$_{x1}$Ni$_{y1}$Co$_{z1}$V$_{a1}$PO$_4$, any oxidation state thereof, or any combination thereof. Generally, x1, y1, z1, and a1 are independently selected from suitable numbers, such as a number from 0 to 5 or from greater than 0 to 5.

In certain embodiments, provided herein is a plurality of nanofibers, the nanofibers comprising lithium, such as a continuous matrix of a lithium containing material (e.g., a lithium salt or lithium alloy/insertion compound, such as a lithium metal oxide). In other embodiments, provided herein is an electrode (e.g., positive electrode or cathode) comprising a plurality of nanofibers, the nanofibers comprising (a) a continuous matrix material; and (b) discrete, isolated domains comprising lithium. In some embodiments, the continuous matrix or isolated domains comprise lithium in the form of a lithium containing metal alloy. In specific embodiments, the lithium containing metal alloy is a lithium metal oxide. In some embodiments, the nanofiber(s) comprise a lithium containing material of the following formula (I):

$$Li_aM_bX_c \qquad (I)$$

In certain embodiments, M represents one or more metal element (e.g., M represents Fe, Ni, Co, Mn, V, Ti, Zr, Ru, Re, Pt, Bi, Pb, Cu, Al, Li, or a combination thereof) and X represents one or more non-metal (e.g., X represents C, N, O, P, S, $SO_4$, $PO_4$, Se, halide, F, CF, $SO_2$, $SO_2Cl_2$, I, Br, $SiO_4$, $BO_3$, or a combination thereof) (e.g., a non-metal anion). In some embodiments, a is 1-5 (e.g., 1-2), b is 0-2, and c is 0-10 (e.g., 1-4, or 1-3).

In some embodiments, X is selected from the group consisting of O, $SO_4$, $PO_4$, $SiO_4$, $BO_3$. In more specific embodiments, X is selected from the group consisting of O, $PO_4$, and $SiO_4$. In certain embodiments, M is Mn, Ni, Co, Fe, V, Al, or a combination thereof.

In certain embodiments, a lithium material of formula (I) is $LiMn_2O_4$, $LiNi_{1/3}Co_{1/3}Mn_{1/3}O_2$, $LiCoO_2$, $LiNiO_2$, $LiFePO_4$, $Li_2FePO_4F$, or the like. In some embodiments, a lithium material of formula (I) is $LiNi_{b1}Co_{b2}Mn_{b3}O_2$, wherein 0≤b1+b2+b3=1, and wherein 0≤b1, b2, b3<1. In some embodiments, a lithium material of formula (I) is $LiNi_{b1}Co_{b2}Al_{b3}O_2$, wherein b1+b2+b3=1, and wherein 0<b1, b2, b3<1. In certain embodiments, a lithium material of formula (I) is $LiMn_2O_4$, $LiMn_{b1}Fe_{b2}O_4$ (wherein b1+b2=2, e.g., b1=1.5), $LiMnPO_4$, $LiNiPO_4$, $LiCoPO_4$, $Li_3V_2(PO_4)_3$, $Li_2FeSiO_4$, $Li_2MnSiO_4$, $LiFeBO_3$, or $LiMnBO_3$.

In some embodiments, the lithium material of formula (I) is $Li_2SO_{y'}$, wherein y' is 0-4, such as $Li_2S$ or $Li_2SO_4$.

In more specific embodiments, the lithium metal of formula (I) is represented by the lithium metal of formula (Ia):

$$Li_aM_bO_2 \qquad (Ia)$$

In specific embodiments, M, a, and b are as described above. In specific embodiments, a lithium metal of formula (Ia) has the structure $LiMO_2$ (e.g., $LiNi_{1/3}Co_{1/3}Mn_{1/3}O_2$). In some embodiments, a and b are each 1 and the one or more metal of M have an average oxidation state of 3.

In more specific embodiments, the lithium metal of formula (Ia) is represented by the lithium metal of formula (Ib):

$$Li(M'_{(1-g)}Mn_g)O_2 \qquad (Ib)$$

In certain embodiments, M' represents one or more metal element (e.g., M' represents Fe, Ni, Co, Mn, V, Li, Cu, Zn, or a combination thereof). In some embodiments, g is 0-1 (e.g., 0<g<1). In specific embodiments, M' represents one or more metal having an average oxidation state of 3.

In more specific embodiments, the lithium metal of formula (Ia) or (Ib) is represented by the lithium metal of formula (Ic):

$$Li[Li_{(1-2h/3)}M''_hMn_{(2-h/3)}]O_2 \qquad (Ic)$$

In certain embodiments, M'' represents one or more metal element (e.g., M'' represents Fe, Ni, Co, Zn, V, or a combination thereof). In some embodiments, h is 0-0.5 (e.g., 0<h<0.5, such as 0.083<h<0.5). In a specific embodiment, the lithium metal of formula (Ic) is $Li[Li_{(1-2h)/3}Ni_hCo_{(h-h')}Mn_{(2-h/3)}]O_2$, wherein h' is 0-0.5 (e.g., 0<h'<0.5).

In more specific embodiments, the lithium metal of formula (Ia) is represented by the lithium metal of formula (Id):

$$LiNi_bCo_{b''}M'''_{b'''}O_2 \qquad (Id)$$

In certain embodiments, M''' represents one or more metal element (e.g., M''' represents Fe, Mn, Zn, V, or a combination thereof). In some embodiments, each of b', b'', and b''' is independently 0-2 (e.g., 0-1, such as 0<b', b'', and b'''<1). In specific embodiments, the sum of b', b'', and b''' is 1. In some embodiments, the one or more metal of M''' when taken together with the Ni and Co have an average oxidation state of 3.

In some embodiments, the lithium metal of formula (I) is represented by the lithium metal of formula (Ie):

$$Li_aM_bO_3 \qquad (Ie)$$

In specific embodiments, M, a, and b are as described above. In specific embodiments, a lithium metal of formula (Ie) has the structure $Li_2MO_3$ (e.g., $Li_2MnO_3$). In some embodiments, a is 2, b is 1 and the one or more metal of M have an average oxidation state of 4.

In certain embodiments, provided herein is an electrode (e.g., positive electrode or cathode) comprising a plurality of nanofibers, the nanofibers comprising a continuous matrix of a lithium containing metal (e.g., a lithium metal alloy, such as a lithium metal oxide). In other embodiments, provided herein is an electrode (e.g., positive electrode or cathode) comprising a plurality of nanofibers, the nanofibers comprising (a) a continuous matrix material; and (b) discrete, isolated domains of a lithium containing metal (e.g., a lithium metal alloy, such as a lithium metal oxide).

In some embodiments, the plurality of nanofibers have a continuous matrix of a lithium containing material. In certain embodiments, the continuous matrix of lithium containing material is porous (e.g., mesoporous). In certain embodiments, the continuous matrix of lithium containing material is hollow (e.g., hollow lithium containing metal nanofibers).

In specific embodiments, the nanofibers comprise (e.g., on average) at least 50% lithium containing material (e.g., by elemental analysis). In specific embodiments, the nanofibers comprise (e.g., on average) at least 70% lithium containing material. In more specific embodiments, the nanofibers comprise (e.g., on average) at least 80% lithium containing material. In still more specific embodiments, the nanofibers comprise (e.g., on average) at least 90% lithium containing material. In yet more specific embodiments, the nanofibers comprise (e.g., on average) at least 95% lithium containing material.

In certain embodiments, the nanofibers comprise (e.g., on average) at least 0.5 wt. % lithium (e.g., by elemental analysis). In specific embodiments, the nanofibers comprise (e.g., on average) at least 1 wt. % lithium (e.g., by elemental analysis). In more specific embodiments, the nanofibers comprise (e.g., on average) at least 2.5 wt. % lithium (e.g., by elemental analysis). In still more specific embodiments, the nanofibers comprise (e.g., on average) at least 5 wt. % lithium (e.g., by elemental analysis). In specific embodiments, the nanofibers comprise (e.g., on average) at least 7 wt. % lithium (e.g., by elemental analysis). In more embodiments, the nanofibers comprise (e.g., on average) at least 10 wt. % lithium (e.g., by elemental analysis).

In some embodiments, lithium atoms constitute (e.g., on average) at least 10% of the atoms present in the nanofibers. In specific embodiments, lithium atoms constitute (e.g., on average) at least 20% of the atoms present in the nanofibers. In more specific embodiments, lithium atoms constitute (e.g., on average) at least 30% of the atoms present in the nanofibers. In still more specific embodiments, lithium atoms constitute (e.g., on average) at least 40% of the atoms present in the nanofibers. In yet more specific embodiments, lithium atoms constitute (e.g., on average) at least 50% of the atoms present in the nanofibers. For example, in certain embodiments, provided herein are nanofibers comprising pure $LiNi_{1/3}Co_{1/3}Mn_{1/3}O_2$, which comprises about 7 wt. % lithium (6.94 mol wt. Li/96.46 mol wt. $LiNi_{1/3}Co_{1/3}Mn_{1/3}O_2$) and about 25% lithium atoms (1 lithium atom/(1 lithium atom+⅓ nickel atom+⅓ manganese atom+⅓ cobalt atom+2 oxygen atoms)).

In some embodiments, the electrode comprises a plurality of nanofibers comprising (a) a matrix; and (b) a plurality of isolated, discrete domains comprising a lithium containing metal (e.g., a lithium alloy/intercalculation compound, such as a lithium metal oxide). In specific embodiments, the matrix is a continuous matrix of carbon (e.g., amorphous carbon). In certain embodiments, the matrix and/or discrete lithium containing domains are porous (e.g., mesoporous). In certain embodiments, the continuous matrix is hollow. In specific embodiments, the nanofibers comprise (e.g., on average) at least 30% lithium material (e.g., by elemental analysis). In specific embodiments, the nanofibers comprise (e.g., on average) at least 40% lithium material. In more specific embodiments, the nanofibers comprise (e.g., on average) at least 50% lithium material. In still more specific embodiments, the nanofibers comprise (e.g., on average) at least 70% lithium material. In yet more specific embodiments, the nanofibers comprise (e.g., on average) at least 80% lithium material. In some embodiments, the nanofibers comprise lithium containing domains that comprise (e.g., on average) at least 70% lithium material. In more specific embodiments, the domains comprise (e.g., on average) at least 80% lithium material. In still more specific embodiments, the domains comprise (e.g., on average) at least 90% lithium material. In yet more specific embodiments, the domains comprise (e.g., on average) at least 95% lithium material. In certain embodiments, the nanofibers comprise (e.g., on average) at least 0.1 wt. % lithium (e.g., by elemental analysis). In specific embodiments, the nanofibers comprise (e.g., on average) at least 0.5 wt. % lithium (e.g., by elemental analysis). In more specific embodiments, the nanofibers comprise (e.g., on average) at least 1 wt. % lithium (e.g., by elemental analysis). In still more specific embodiments, the nanofibers comprise (e.g., on average) at least 2.5 wt. % lithium (e.g., by elemental analysis). In specific embodiments, the nanofibers comprise (e.g., on average) at least 5 wt. % lithium (e.g., by elemental analysis). In more embodiments, the nanofibers comprise (e.g., on average) at least 10 wt. % lithium (e.g., by elemental analysis). In some embodiments, lithium atoms constitute (e.g., on average) at least 10% of the atoms present in the nanofibers. In specific embodiments, lithium atoms constitute (e.g., on average) at least 5% of the atoms present in the nanofibers or the domains. In more specific embodiments, lithium atoms constitute (e.g., on average) at least 10% of the atoms present in the nanofibers or domains. In still more specific embodiments, lithium atoms constitute (e.g., on average) at least 20% of the atoms present in the nanofibers or domains. In yet more specific embodiments, lithium atoms constitute (e.g., on average) at least 30% of the atoms present in the nanofibers or domains. In further embodiments, lithium atoms constitute (e.g., on average) at least 40%, at least 50%, or the like of the atoms present in the domains.

In certain embodiments, provided herein are lithium-containing-nanofibers comprising a lithium material described herein, wherein up to 50% of the lithium is absent. In some instances, the lithium is absent due to delithiation (de-intercalculation of lithium) during lithium ion battery operation. In other instances, the lithium is absent due to volatility and/or sublimation of the lithium component. In specific embodiments, up to 40% of the lithium is absent. In more specific embodiments, up to 30% of the lithium is absent. In still more specific embodiments, up to 20% of the lithium is absent. In yet more specific embodiments, up to 10% of the lithium is absent.

In some embodiments, provided herein is a battery comprising such an electrode (e.g., cathode). In specific embodiments, the battery is a secondary cell. Also, provided in certain embodiments herein are nanofibers or nanofiber mats comprising one or more such nanofiber as described herein.

Nanofibers

In some embodiments, the nanofibers provide herein comprise a backbone material (a core matrix material). In specific embodiments, the backbone material is a lithium material described herein. In other specific embodiments, the backbone material is a continuous matrix material with non-aggregated domains embedded therein, the non-aggregated domains comprising a lithium material described herein (e.g., a nanoparticle comprising a lithium material described herein). In certain embodiments, nanofibers described herein comprise a hollow core. In specific embodiments, the nanofibers described herein comprise a continuous matrix material surrounding the hollow core. In more specific embodiments, the continuous matrix material comprises a lithium material described herein. In other specific embodiments, the continuous matrix material comprises non-aggregated domains embedded therein, the non-aggregated domains comprising a lithium material described herein (e.g., a nanoparticle comprising a lithium material described herein). In various embodiments herein, a continuous matrix material is comprises a ceramic, a metal, or carbon. In specific embodiments, the continuous matrix material is a conductive material.

The nanofibers have any suitable diameter. In some embodiments, a collection of nanofibers comprises nanofibers that have a distribution of fibers of various diameters. In some embodiments, a single nanofiber has a diameter that varies along its length. In some embodiments, fibers of a population of nanofibers or portions of a fiber accordingly exceed or fall short of the average diameter. In some embodiments, the nanofiber has on average a diameter of about 20 nm, about 30 nm, about 40 nm, about 50 nm, about 60 nm, about 70 nm, about 80 nm, about 90 nm, about 100 nm, about 130 nm, about 150 nm, about 200 nm, about 250 nm, about 300 nm, about 400 nm, about 500 nm, about 600 nm, about 700 nm, about 800 nm, about 900 nm, about 1,000 nm, about 1,500 nm, about 2,000 nm and the like. In some embodiments, the nanofiber has on average a diameter of at most 20 nm, at most 30 nm, at most 40 nm, at most 50 nm, at most 60 nm, at most 70 nm, at most 80 nm, at most 90 nm, at most 100 nm, at most 130 nm, at most 150 nm, at most 200 nm, at most 250 nm, at most 300 nm, at most 400 nm, at most 500 nm, at most 600 nm, at most 700 nm, at most 800 nm, at most 900 nm, at most 1,000 nm, at most 1,500 nm, at most 2,000 nm and the like. In some embodiments, the nanofiber has on average a diameter of at least 20 nm, at least 30 nm, at least 40 nm, at least 50 nm, at least 60 nm, at least 70 nm, at least 80 nm, at least 90 nm, at least 100 nm, at least 130 nm, at least 150 nm, at least 200 nm, at least 250 nm, at least 300 nm, at least 400 nm, at least 500 nm, at least 600 nm, at least 700 nm, at least 800 nm, at least 900 nm, at least 1,000 nm, at least 1,500 nm, at least 2,000 nm and the like. In yet other embodiments, the nanofiber has on average a diameter between about 50 nm and about 300 nm, between about 50 nm and about 150 nm, between about 100 nm and about 400 nm, between about 100 nm and about 200 nm, between about 500 nm and about 800 nm, between about 60 nm and about 900 nm, and the like.

"Aspect ratio" is the length of a nanofiber divided by its diameter. In some embodiments, aspect ratio refers to a single nanofiber. In some embodiments, aspect ratio is applied to a plurality of nanofibers and reported as a single average value, the aspect ratio being the average length of the nanofibers of a sample divided by their average diameter. Diameters and/or lengths are measured by microscopy in some instances. The nanofibers have any suitable aspect ratio. In some embodiments the nanofiber has an aspect ratio of about 10, about $10^2$, about $10^3$, about $10^4$, about $10^5$, about $10^6$, about $10^7$, about $10^8$, about $10^9$, about $10^{10}$, about $10^{11}$, about $10^{12}$, and the like. In certain embodiments the nanofiber has an aspect ratio of at least 10, at least $10^2$, at least $10^3$, at least $10^4$, at least $10^5$, at least $10^6$, at least $10^7$, at least $10^8$, at least $10^9$, at least $10^{10}$, at least $10^{11}$, at least $10^{12}$, and the like. In other embodiments, the nanofiber is of substantially infinite length and has an aspect ratio of substantially infinity.

In certain embodiments, the lithium material (e.g., core matrix lithium material) provided herein is crystalline. In some embodiments, the lithium material comprises a layered crystalline structure. In certain embodiments, the lithium material comprises a spinel crystalline structure. In certain embodiments, the lithium material comprises an olivine crystalline structure.

In some embodiments, domains of lithium material provided herein have any suitable size. In some instances, the domains have an average diameter of about 5 nm, about 10 nm, about 20 nm, about 30 nm, about 40 nm, about 50 nm, about 60 nm, about 70 nm, about 80 nm, about 90 nm, about 100 nm, about 130 nm, about 150 nm, about 200 nm, and the like. In some instances, the domains have an average diameter of at most 5 nm, at most 10 nm, at most 20 nm, at most 30 nm, at most 40 nm, at most 50 nm, at most 60 nm, at most 70 nm, at most 80 nm, at most 90 nm, at most 100 nm, at most 130 nm, at most 150 nm, at most 200 nm, and the like.

In one aspect, the domains of high energy material have a uniform size. In some instances, the standard deviation of the size of the domains is about 50%, about 60%, about 70%, about 80%, about 100%, about 120%, about 140%, about 200%, and the like of the average size of the domains (i.e., the size is uniform). In some instances, the standard deviation of the size of the domains is at most 50%, at most 60%, at most 70%, at most 80%, at most 100%, at most 120%, at most 140%, at most 200%, and the like of the average size of the domains (i.e., the size is uniform).

The domains of high energy material have any suitable distance between each other (separation distance). In some instances, the domains have an average separation distance of about 2 nm, about 5 nm, about 10 nm, about 20 nm, about 30 nm, about 40 nm, about 50 nm, about 60 nm, about 70 nm, about 80 nm, about 90 nm, about 100 nm, about 130 nm, about 150 nm, about 200 nm, and the like. In some instances, the domains have an average diameter of at most 2 nm, at most 5 nm, at most 10 nm, at most 20 nm, at most 30 nm, at most 40 nm, at most 50 nm, at most 60 nm, at most 70 nm, at most 80 nm, at most 90 nm, at most 100 nm, at most 130 nm, at most 150 nm, at most 200 nm, and the like.

In some embodiments, the domains are uniformly distributed within the nanofiber matrix. In some instances, the standard deviation of the distances between a given domain and the nearest domain to the given domain is about 50%, about 60%, about 70%, about 80%, about 100%, about 120%, about 140%, about 200%, and the like of the average of the distances (i.e., uniform distribution). In some instances, the standard deviation of the distances between a given domain and the nearest domain to the given domain is at most 50%, at most 60%, at most 70%, at most 80%, at most 100%, at most 120%, at most 140%, at most 200%, and the like of the average of the distances (i.e., uniform distribution). In some embodiments, less than 40% of the domains (e.g., nanoparticles) are aggregated (e.g., as measured in any suitable manner, such as by TEM). In specific embodiments, less than 30% of the domains are aggregated. In more specific embodiments, less than 25% of the domains are aggregated. In yet more specific embodiments, less than 20% of the domains are aggregated. In still more specific embodiments, less than 10% of the domains are aggregated. In more specific embodiments, less than 5% of the domains are aggregated.

The domains of lithium material comprise any suitable mass of the nanofiber. In some instances, the domains comprise about 10%, about 20%, about 30%, about 40%, about 50%, about 60%, about 70%, about 80%, about 90%, and the like of the mass of the nanofiber. In some instances, the domains comprise at least 10%, at least 20%, at least 30%, at least 40%, at least 50%, at least 60%, at least 70%, at least 80%, at least 90%, and the like of the mass of the nanofiber. In some instances, the domains comprise at most 10%, at most 20%, at most 30%, at most 40%, at most 50%, at most 60%, at most 70%, at most 80%, at most 90%, and the like of the mass of the nanofiber.

In various embodiments, the nanofibers have a high surface area and methods are described for making nanofibers having a high surface area. In some embodiments, ordering of the pores results in a high surface area and/or specific surface area (e.g., surface area per mass of nanofiber and/or surface area per volume of nanofiber) in some instances. In certain embodiments, the nanofibers (e.g., porous nanofibers) provided herein have a specific surface area of at least 10 $m^2/g$, at least 50 $m^2/g$, at least 100 $m^2/g$, at least 200 $m^2/g$, at least 500 $m^2/g$, at least 1,000 $m^2/g$, at least 2,000 $m^2/g$, at least 5,000 $m^2/g$, at least 10,000 $m^2/g$, and the like. The "specific surface area" is the surface area of at least one fiber divided by the mass of the at least one fiber. The specific surface area is calculated based on a single nanofiber, or based on a collection of nanofibers and reported as a single average value. Techniques for measuring mass are known to those skilled in the art. In some embodiments, the surface area is measured by physical or chemical methods, for example by the Brunauer-Emmett, and Teller (BET) method where the difference between physisorption and desorption of inert gas is utilized to determine the surface area or by titrating certain chemical groups on the nanofiber to estimate the number of groups on the surface, which is related to the surface area by a previously determined titration curve. Those skilled in the art of chemistry will be familiar with methods of titration.

The nanofiber has any suitable length. A given collection of nanofibers comprises nanofibers that have a distribution of fibers of various lengths. Therefore, certain fibers of a population accordingly exceed or fall short of the average length. In some embodiments, the nanofiber has an (average) length of at least about 1 μm, at least about 10 μm, at least about 20 μm, at least about 50 μm, at least about 100 μm, at least about 500 μm, at least about 1,000 μm, at least about 5,000 μm, at least about 10,000 μm, at least about 50,000 μm, at least about 100,000 μm, at least about 500,000 μm, and the like. Methods for measuring the length of a nanofiber include, but are not limited to microscopy, optionally transmission electron microscopy ("TEM") or scanning electron microscopy ("SEM").

In one aspect, the nanofiber has is substantially contiguous or has a continuous matrix material. A nanofiber is substantially contiguous or a material constitutes a continuous matrix of the nanofiber if when following along the length of the nanofiber, the fiber material is in contact with at least some neighboring fiber material over substantially the entire nanofiber length. "Substantially" the entire length means that at least 80%, at least 90%, at least 95%, or at least 99% of the length of the nanofiber is contiguous. The nanofiber is optionally substantially contiguous in combination with any of the porosities described herein (e.g., 35%).

In one aspect, the nanofiber is substantially flexible or non-brittle. Flexible nanofibers are able to deform when a stress is applied and optionally return to their original shape when the applied stress is removed. A substantially flexible nanofiber is able to deform by at least 5%, at least 10%, at least 20%, at least 50%, and the like in various embodiments. A non-brittle nanofiber does not break when a stress is applied. In some embodiments, the nanofiber bends (e.g., is substantially flexible) rather than breaks. A substantially non-brittle nanofiber is able to deform by at least 5%, at least 10%, at least 20%, at least 50%, and the like without breaking in various embodiments.

Process

In one aspect, a process is described for producing lithium containing nanofibers. In some embodiments the method comprises: (a) electrospinning a fluid stock to form nanofibers, the fluid stock comprising (i) a lithium precursor or lithium containing nanoparticles and (ii) a polymer; and (b) thermally treating the nanofibers. In some embodiments, electrospinning of the fluid stock is gas assisted (e.g., coaxially gas assisted). In further embodiments, a lithium ion battery electrode is optionally formed using such nanofibers (or smaller nanofibers, such as fragments produced by sonication of the thermally treated nanofibers).

In specific embodiments, a process for producing lithium containing nanofibers comprises (a) electrospinning a fluid stock to form as-spun nanofibers, the fluid stock comprising lithium precursor, a second metal precursor, and a polymer; and (b) thermally treating the as-spun nanofibers to produce the lithium containing nanofibers. In more specific embodiments, the process further comprises chemically treating (e.g., oxidizing, such as with air) the nanofibers. In certain embodiments, the chemical treatment occurs simultaneously with step (b). In other embodiments, the chemical treatment step occurs after step (b). In certain embodiments, the electrospinning is gas assisted. In specific embodiments, the electrospinning is coaxially gas assisted. In some embodiments, the fluid stock is aqueous. In specific embodiments, the polymer is a water soluble polymer, such as polyvinyl alcohol (PVA).

In specific embodiments, a process for producing lithium containing nanofibers comprises (a) electrospinning a fluid stock to form as-spun nanofibers, the fluid stock comprising a nanoparticle comprising a lithium material and a polymer; and (b) thermally treating the as-spun nanofibers to produce the lithium containing nanofibers. In certain embodiments, the thermal treatment occurs under inert conditions (e.g., in an argon atmosphere). In certain embodiments, the electrospinning is gas assisted. In specific embodiments, the electrospinning is coaxially gas assisted. In some embodiments, the fluid stock is aqueous. In specific embodiments, the polymer is a water soluble polymer, such as polyvinyl alcohol (PVA). In other embodiments, fluid is a solvent based solution. In some embodiments, the polymer is a solvent soluble polymer, such as polyacrylonitrile (PAN).

Figure 19:
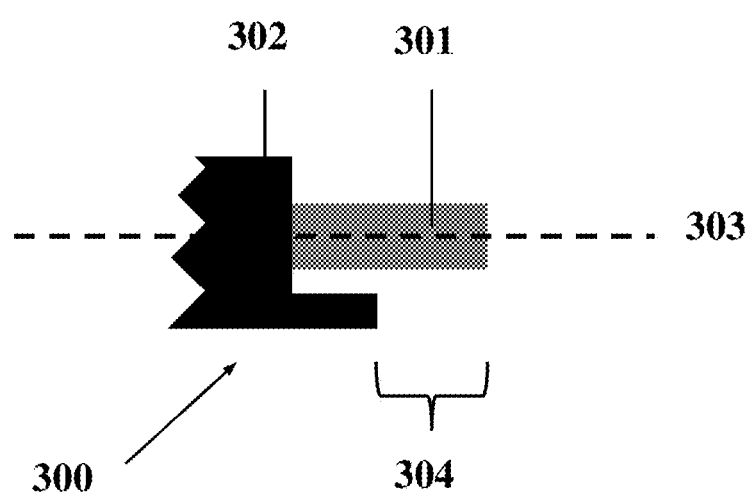
FIG. 19 illustrates a co-axial electrospinning needle apparatus that may be used for gas assisted electrospinning of a single fluid or for multilayered coaxial electrospinning (multi-layered gas assisted electrospinning is possible with an additional needle in the needle apparatus configured around the illustrated needles and aligned along the common axis).

In some embodiments, gas assisted electrospinning processes or apparatus described herein providing or providing a device configured to provide a flow of gas along the same axis as an electrospun fluid stock. In some instances, that gas (or gas needle) is provided along the same axis with the fluid stock (or fluid stock needle) (e.g., and adjacent thereto). In specific instances, the gas (or gas needle) is provided coaxially with the fluid stock (or fluid stock needle). FIG. 19 illustrates co-axial electrospinning apparatus 300. The coaxial needle apparatus comprises an inner needle 301 and an outer needle 302, both of which needles are coaxially aligned around a similar axis 303 (e.g., aligned with 5 degrees, 3 degrees, 1 degree, or the like). In some embodiments, further coaxial needles may be optionally placed around, inside, or between the needles 301 and 302, which are aligned around the axis 303 (e.g., as illustrated in FIG. 1). In some instances, the termination of the needles is optionally offset 304. In some embodiments, gas assisted electrospinning is utilized (e.g., about a common axis with the jet electrospun from a fluid stock described herein). Exemplary methods of gas-assisted electrospinning are described in PCT Patent Application PCT/US2011/024894 ("Electrospinning apparatus and nanofibers produced therefrom"), which is incorporated herein for such disclosure. In gas-assisted embodiments, the gas is optionally air or any other suitable gas (such as an inert gas, oxidizing gas, or reducing gas). In some embodiments, gas assistance increases the throughput of the process and/or reduces the diameter of the nanofibers. In some instances, gas assisted electrospinning accelerates and elongates the jet of fluid stock emanating from the electrospinner. In some instances, gas assisted electrospinning facilitates uniform dispersion of nanoparticles in the nanofibers. For example, in some instances, gas assisted electrospinning (e.g., coaxial electrospinning of a gas—along a substantially common axis—with a fluid stock comprising lithium containing nanoparticles) facilitates dispersion or non-aggregation of the nanoparticles in the electrospun jet and the resulting as-spun nanofiber (and subsequent nanofibers produced therefrom). In some embodiments, incorporating a gas stream inside a fluid stock produces hollow nanofibers.

Fluid Stocks

In some embodiments, the fluid stock comprises (i) a lithium-containing material (e.g., as a nanoparticle) or (ii) a lithium precursor (e.g., lithium salt). In specific embodiments, the fluid stock comprises a lithium precursor and at least one additional metal precursor (e.g., a cobalt precursor, a manganese precursor, a nickel precursor, or a combination thereof). In some embodiments, each metal precursor is independently a metal acetate, metal nitrate, metal acetylacetonate, metal chloride, metal hydride, hydrates thereof, or any combination thereof.

In some embodiments, the amount of lithium precursor and metal precursor utilized herein are used in a fluid stock or process described herein in a molar ratio that is the same as the lithium material being prepared. For example, in some embodiments wherein a nanofiber comprising a continuous matrix of a lithium material of formula (I) is being prepared, the lithium precursor to additional metal precursor is present in an a:b ratio.

$$Li_aM_bX_c \qquad (I)$$

In certain embodiments, excess lithium precursor is optionally utilized (e.g., to make up for lithium that may be lost to sublimation during thermal processing). In some embodiments, at least a 50% molar excess of lithium is utilized. In other embodiments, at least a 100% molar excess is utilized. For example, the lithium precursor to additional metal precursor for preparing a material of formula (I) is present in a ratio of at least 1.5a:b (50% excess) or, more specifically, at least 2a:b (100% excess). Similar ratios for any of the lithium material formulas described herein are also contemplated.

In some embodiments, metal precursor comprise alkali metal salts or complexes, alkaline earth metal salts or complexes, transition metal salts or complexes, or the like. In specific embodiments, the fluid stock comprises a lithium precursor and at least one additional metal precursor, wherein the metal precursor comprises an iron precursor, a nickel precursor, a cobalt precursor, a manganese precursor, a vanadium precursor, a titanium precursor, a ruthenium precursor, a rhenium precursor, a platinum precursor, a bismuth precursor, a lead precursor, a copper precursor, an aluminum precursor, a combination thereof, or the like. In more specific embodiments, the additional metal precursor comprises an iron precursor, a nickel precursor, a cobalt precursor, a manganese precursor, a vanadium precursor, an aluminum precursor, or a combination thereof. In still more specific embodiments, the additional metal precursor comprises an iron precursor, a nickel precursor, a cobalt precursor, a manganese precursor, an aluminum precursor, or a combination thereof. In yet more specific embodiments, the additional metal precursor comprises a nickel precursor, a cobalt precursor, a manganese precursor, or a combination thereof. In still more specific embodiments, the additional metal precursor comprises at least two metal precursors from the group consisting of: a nickel precursor, a cobalt precursor, and a manganese precursor. In more specific embodiments, the additional metal precursor comprises a nickel precursor, a cobalt precursor, and a manganese precursor. In specific embodiments, metal precursors include metal salts or complexes, wherein the metal is associated with any suitable ligand or radical, or anion or other Lewis Base, e.g., a carboxylate (e.g., —OCOCH$_3$ or another —OCOR group, wherein R is an alkyl, substituted alkyl, aryl, substituted aryl, or the like, such as acetate), an alkoxide (e.g., a methoxide, ethoxide, isopropyl oxide, t-butyl oxide, or the like), a halide (e.g., chloride, bromide, or the like), a diketone (e.g., acetylacetone, hexafluoroacetylacetone, or the like), a nitrates, amines (e.g., NR'$_3$, wherein each R" is independently R or H or two R", taken together form a heterocycle or heteroaryl), and combinations thereof. In specific embodiments, the precursors are acetates (e.g., lithium acetate).

In some embodiments, (e.g., where metal precursors are utilized, such as a lithium precursor and one or more additional metal precursor) the weight ratio of the metal component(s) (including lithium precursor and additional metal precursors) to polymer is at least 1:5, at least 1:4, at least 1:3, at least 1:2, at least 1:1, at least 1.25:1, at least 1.5:1, at least 1.75:1, at least 2:1, at least 3:1, or at least 4:1. In some instances, wherein the lithium material is prepared from a preformed lithium-containing-nanoparticle, the nanoparticle to polymer weight ratio is at least 1:5, at least 1:4, at least 1:3, at least 1:2, or the like. In some instances, wherein the metal component of a process described herein comprises a lithium precursor and at least one additional metal precursor, the metal component (both lithium and additional metal precursors) to polymer ratio is at least 1:3, at least 1:2, at least 1:1, or the like. In some embodiments, the monomeric residue (i.e., repeat unit) concentration of the polymer in the fluid stock is at least 100 mM. In specific embodiments, the monomeric residue (i.e., repeat unit) concentration of the polymer in the fluid stock is at least 200 mM. In more specific embodiments, the monomeric residue (i.e., repeat unit) concentration of the polymer in the fluid stock is at least 400 mM. In still more specific embodiments, the monomeric residue (i.e., repeat unit) concentration of the polymer in the fluid stock is at least 500 mM. In some embodiments, the fluid stock comprises at least about 0.5 weight %, at least about 1 weight %, at least about 2 weight %, at least about 5 weight %, at least about 10 weight %, at least about 20 weight %, or at least about 30 weight % polymer.

In some embodiments, a polymer in a process, fluid stock or nanofiber described herein is an organic polymer. In some embodiments, polymers used in the compositions and processes described herein are hydrophilic polymers, including water-soluble and water swellable polymers. In some aspects, the polymer is soluble in water, meaning that it forms a solution in water. In other embodiments, the polymer is swellable in water, meaning that upon addition of water to the polymer the polymer increases its volume up to a limit. Exemplary polymers suitable for the present methods include but are not limited to polyvinyl alcohol ("PVA"), polyvinyl acetate ("PVAc"), polyethylene oxide ("PEO"), polyvinyl ether, polyvinyl pyrrolidone, polyglycolic acid, hydroxyethylcellulose ("HEC"), ethylcellulose, cellulose ethers, polyacrylic acid, polyisocyanate, and the like. In some embodiments, the polymer is isolated from biological material. In some embodiments, the polymer is starch, chitosan, xanthan, agar, guar gum, and the like. In other instances, e.g., wherein silicon nanoparticles are utilized as the silicon component, other polymers, such as polyacrylonitrile ("PAN") are optionally utilized (e.g., with DMF as a solvent). In other instances, a polyacrylate (e.g., polyalkacrylate, polyacrylic acid, polyalkylalkacrylate, such as poly(methyl methacrylate) (PMMA), or the like), or polycarbonate is optionally utilized. In some instances, the polymer is polyacrylonitrile (PAN), polyvinyl alcohol (PVA), a polyethylene oxide (PEO), polyvinylpyridine, polyisoprene (PI), polyimide, polylactic acid (PLA), a polyalkylene oxide, polypropylene oxide (PPO), polystyrene (PS), a polyarylvinyl, a polyheteroarylvinyl, a nylon, a polyacrylate (e.g., poly acrylic acid, polyalkylalkacrylate— such as polymethylmethacrylate (PMMA), polyalkylacrylate, polyalkacrylate), polyacrylamide, polyvinylpyrrolidone (PVP) block, polyacrylonitrile (PAN), polyglycolic acid, hydroxyethylcellulose (HEC), ethylcellulose, cellulose ethers, polyacrylic acid, polyisocyanate, or a combination thereof.

Polymers of any suitable molecular weight may be utilized in the processes and nanofibers described herein. In some instances, a suitable polymer molecular weight is a molecular weight that is suitable for electrospinning the polymer as a melt or solution (e.g., aqueous solution or solvent solution—such as in dimethyl formamide (DMF) or alcohol). In some embodiments, the polymer utilized has an average atomic mass of 1 kDa to 1,000 kDa. In specific embodiments, the polymer utilized has an average atomic mass of 10 kDa to 500 kDa. In more specific embodiments, the polymer utilized has an average atomic mass of 10 kDa to 250 kDa. In still more specific embodiments, the polymer utilized has an average atomic mass of 50 kDa to 200 kDa.

In some embodiments, the polymers described herein (e.g., hydrophilic or nucleophilic polymers) associate (e.g., through ionic, covalent, metal complex interactions) with metal precursors described herein when combined in a fluid stock. Thus, in certain embodiments, provided herein is a fluid stock that comprises (a) at least one polymer; (b) a lithium precursor; and (c) an additional metal precursor (e.g., a metal acetate or metal alkoxide), or is prepared by combining (i) at least one polymer; (ii) a lithium precursor; and (iii) at least one additional metal precursor. In certain embodiments, upon electrospinning of such a fluid stock, a nanofiber comprising a polymer associated with the metal precursors is produced. For example, provided in specific embodiments herein is a fluid stock comprising PVA in association with a lithium precursor and at least one additional metal precursor. In some embodiments, this association is present in a fluid stock or in a nanofiber. In specific embodiments, the association having the formula: —($CH_2$—$CHOM^1)_{n1}$—. In specific embodiments, each M is independently selected from H, a metal ion, and a metal complex (e.g., a metal halide, a metal carboxylate, a metal alkoxide, a metal diketone, a metal nitrate, a metal amine, or the like).

In further embodiments, provided herein is a polymer (e.g., in a fluid stock or nanofiber) having the following formula: $(A_d R^1{}_n — BR^1{}_m R^2)_a$. In some embodiments, each of A and B are independently selected from C, O, N, or S. In certain embodiments, at least one of A or B is C. In some embodiments, each $R^1$ is independently selected from H, halo, CN, OH, $NO_2$, $NH_2$, NH(alkyl) or N(alkyl)(alkyl), $SO_2$alkyl, $CO_2$-alkyl, alkyl, heteroalkyl, alkoxy, S-alkyl, cycloalkyl, heterocycle, aryl, or heteroaryl. In certain embodiments, the alkyl, alkoxy, S-alkyl, cycloalkyl, heterocycle, aryl, or heteroaryl is substituted or unsubstituted. In some embodiments, $R^2$ is $M^1$, $OM^1$, $NHM^1$, or $SM^1$, as described above. In specific embodiments, if $R^1$ or $R^2$ is $M^1$ the A or B to which it is attached is not C. In some embodiments, any alkyl described herein is a lower alkyl, such as a $C_1$-$C_6$ or $C_1$-$C_3$ alkyl. In certain embodiments, each R1 or R2 is the same or different. In certain embodiments, d is 1-10, e.g., 1-2. In certain embodiments, n is 0-3 (e.g., 1-2) and m is 0-2 (e.g., 0-1). In some embodiments, a is 100-1,000,000. In specific embodiments, a substituted group is optionally substituted with one or more of H, halo, CN, OH, $NO_2$, $NH_2$, NH(alkyl) or N(alkyl)(alkyl), $SO_2$alkyl, $CO_2$-alkyl, alkyl, heteroalkyl, alkoxy, S-alkyl, cycloalkyl, heterocycle, aryl, or heteroaryl. In certain embodiments, the block co-polymer is terminated with any suitable radical, e.g., H, OH, or the like.

In specific embodiments, at least 5% of $M^1$ are $Li^+$. In more specific embodiments, at least 10% of $M^1$ are $Li^+$. In more specific embodiments, at least 15% of $M^1$ are $Li^+$. In still more specific embodiments, at least 20% of $M^1$ are $Li^+$. In more specific embodiments, at least 40% of $M^1$ are $Li^+$. In further embodiments, at least 10% of $M^1$ are a non-lithium metal complex (e.g., iron acetate, cobalt acetate, manganese acetate, nickel acetate, aluminum acetate, or a combination thereof). In more specific embodiments, at least 15% of $M^1$ are non-lithium metal complex. In still more specific embodiments, at least 20% of $M^1$ are non-lithium metal complex. In more specific embodiments, at least 40% of $M^1$ are non-lithium metal complex. In various embodiments, n1 is any suitable number, such as 1,000 to 1,000,000.

In one aspect, described herein is a method for producing an ordered mesoporous nanofiber, the method comprising: (a) coaxially electrospinning a first fluid stock with a second fluid stock to produce a first nanofiber, the first fluid stock comprising at least one block co-polymer and a metal component (e.g., lithium precursor and at least one additional metal precursor), the second fluid stock comprising a coating agent, and the first nanofiber comprising a first layer (e.g., core) and a second layer (e.g., coat) that at least partially coats the first layer; (b) optionally annealing the first nanofiber; (c) optionally removing the second layer from the first nanofiber to produce a second nanofiber comprising the block co-polymer; and (d) thermally and/or chemically treating the first nanofiber or the second nanofiber (e.g. thereby producing an ordered mesoporous nanofiber). In specific embodiments, the block copolymer orders itself upon annealing, with the metal component preferentially going into one phase (e.g., a hydrophilic phase of the copolymer)—and, upon thermal treatment (e.g., calcination of precursor), a mesoporous lithium material is produced. Additional coaxial layers are optional—e.g., comprising a precursor and block copolymer for an additional mesoporous layer, or a precursor and a polymer as described herein for a non-mesoporous layer.

In some embodiments, the block co-polymer comprises a polyisoprene (PI) block, a polylactic acid (PLA) block, a polyvinyl alcohol (PVA) block, a polyethylene oxide (PEO) block, a polyvinylpyrrolidone (PVP) block, polyacrylamide (PAA) block or any combination thereof (i.e., thermally or chemically degradable polymers). In some embodiments, the block co-polymer comprises a polystyrene (PS) block, a poly(methyl methacrylate) (PMMA) block, a polyacrylonitrile (PAN) block, or any combination thereof. In some embodiments, the coating layer and at least part of the block co-polymer (concurrently or sequentially) is selectively removed in any suitable manner, such as, by heating, by ozonolysis, by treating with an acid, by treating with a base, by treating with water, by combined assembly by soft and hard (CASH) chemistries, or any combination thereof. Additionally, U.S. application Ser. No. 61/599,541 and International Application Ser. No. PCT/US13/26060, filed Feb. 14, 2013 are incorporated herein by reference for disclosures related to such techniques.

In some embodiments, the fluid stock further comprises a calcination reagent. In certain embodiments, the calcination reagent is a phosphorus reagent (e.g., for preparing lithium metal phosphates or phosphides upon thermal treatment/calcination of a nanofiber spun from a fluid stock comprising lithium and at least one additional metal precursors), a silicon reagent (e.g., for preparing lithium metal silicates upon thermal treatment/calcination of a nanofiber spun from a fluid stock comprising lithium and at least one additional metal precursors), a sulfur reagent (e.g., for preparing lithium metal sulfides or sulfates upon thermal treatment/calcination of a nanofiber spun from a fluid stock comprising lithium and at least one additional metal precursors), or a boron reagent (e.g., for preparing lithium metal borates upon thermal treatment/calcination of a nanofiber spun from a fluid stock comprising lithium and at least one additional metal precursors). In some embodiments, the reagent is elemental material (e.g., phosphorus, sulfur) or any other suitable chemical compound. In some embodiments, the calcination reagent has the formula: $X^1 R^1{}_q$, wherein $X^1$ is a non-metal (or metalloid), such as S, P, N, B, Si, or Se; each $R^1$ is independently H, halo, CN, OH (or O—), $NO_2$, $NH_2$, —NH(alkyl) or —N(alkyl)(alkyl), —$SO_2$alkyl, —$CO_2$-alkyl, alkyl, heteroalkyl, alkoxy, —S-alkyl, cycloalkyl, heterocycle, aryl, heteroaryl, oxide (=O); and q is 0-10 (e.g., 0-4). In certain embodiments, the alkyl, alkoxy, S-alkyl, cycloalkyl, heterocycle, aryl, or heteroaryl is substituted or unsubstituted. In specific embodiments, q is 0. In some embodiments, R1 is alkoxy (e.g., wherein the calcination reagent is triethylphosphite). In some embodiments wherein metal oxides are prepared, an oxygen reagent is air, which is provided in the atmosphere (e.g., which can react upon sufficient thermal conditions with the metal precursors or calcined metals). In certain embodiments, wherein metal carbides are prepared, a carbon reagent (or carbon source) is the organic polymer material (e.g., which can react upon sufficient thermal conditions with the metal precursor(s)).

Electrospinning

In some embodiments, the process comprises electrospinning a fluid stock. Any suitable method for electrospinning is used.

In some instances, elevated temperature electrospinning is utilized. Exemplary methods for comprise methods for electrospinning at elevated temperatures as disclosed in U.S. Pat. Nos. 7,326,043 and 7,901,610, which are incorporated herein for such disclosure. In some embodiments, elevated temperature electrospinning improves the homogeneity of the fluid stock throughout the electrospinning process.

In some embodiments, gas assisted electrospinning is utilized (e.g., about a common axis with the jet electrospun from a fluid stock described herein). Exemplary methods of gas-assisted electrospinning are described in PCT Patent Application PCT/US2011/024894 ("Electrospinning apparatus and nanofibers produced therefrom"), which is incorporated herein for such disclosure. In gas-assisted embodiments, the gas is optionally air or any other suitable gas (such as an inert gas, oxidizing gas, or reducing gas). In some embodiments, gas assistance increases the throughput of the process and/or reduces the diameter of the nanofibers. In some instances, gas assisted electrospinning accelerates and elongates the jet of fluid stock emanating from the electrospinner. In some instances, gas assisted electrospinning disperses nanoparticles in nanocomposite nanofibers. For example, in some instances, gas assisted electrospinning (e.g., coaxial electrospinning of a gas—along a substantially common axis—with a fluid stock comprising lithium containing nanoparticles) facilitates dispersion or non-aggregation of the Li containing nanoparticles in the electrospun jet and the resulting as-spun nanofiber (and subsequent nanofibers produced therefrom). In some embodiments, incorporating a gas stream inside a fluid stock produces hollow nanofibers. In some embodiments, the fluid stock is electrospun using any suitable technique.

In specific embodiments, the process comprises coaxial electrospinning (electrospinning two or more fluids about a common axis). As described herein, coaxial electrospinning a first fluid stock as described herein with a second fluid is used to add coatings, make hollow nanofibers, make nanofibers comprising more than one material, and the like. In various embodiments, the second fluid is either outside (i.e., at least partially surrounding) or inside (e.g., at least partially surrounded by) the first fluid stock. In some embodiments, the second fluid is a gas (gas-assisted electrospinning) In some embodiments, gas assistance increases the throughput of the process, reduces the diameter of the nanofibers, and/or is used to produce hollow nanofibers. In some embodiments, the method for producing nanofibers comprises coaxially electrospinning the first fluid stock and a gas. In other embodiments, the second fluid is a second fluid stock and comprises a polymer and an optional metal component (e.g., a silicon and/or non-silicon metal component).

In some embodiments, the nanofibers comprise a core material. In some embodiments, the core material is highly conductive. In some embodiments, the highly conductive material is a metal. In one aspect, described herein are methods for producing nanofibers, the nanofibers comprising a core material, optionally a highly conductive core material, optionally a metal core. In some embodiments, lithium nanoparticles are embedded within the core material/matrix.

Thermal/Chemical Treatment

The heating step performs any suitable function. In some embodiments, the heating step carbonizes the polymer. In some embodiments, the heating step removes the polymer. In some embodiments, the heating step selectively removes a polymer phase. In some embodiments, removing (e.g., selectively) the polymer and/or polymer phase results in porous nanofibers. In some embodiments, the heating step calcines and/or crystallizes the precursors. In certain embodiments, the heating step calcines and/or crystallizes the precursors and/or nanoparticles. In some embodiments, the heating step determines the oxidation state of the high energy capacity material, precursors thereof and/or nanoparticles thereof, or any combination thereof.

In some embodiments, the nanofibers are heated in oxidative (e.g., in air atmosphere), inert (e.g., under argon or nitrogen), or reductive conditions (e.g., under hydrogen or inert gas/hydrogen mixtures). In specific embodiments, thermal treatment occurs in the presence of air, nitrogen, nitrogen/$H_2$ (e.g., 95%/5%), argon, argon/$H_2$ (e.g., 96%/4%), or any combination thereof.

Alternatively, in some instances certain chemical reactions occur upon heating, optionally oxidation reactions. In some embodiments, exposure to (e.g., concurrent with thermal treatment) oxidative conditions convert metal precursors to metal oxide or ceramic. In certain embodiments, exposure to (e.g., concurrent with thermal treatment) oxidative conditions convert metal (e.g., metal prepared by calcination of metal precursor to metal under inert or inert/reductive conditions) to metal oxide or ceramic. In some embodiments, oxidative conditions are performed in an oxygen-rich environment, such as air. In one particular example where the nanofiber is a ceramic nanofiber, calcination is performed in air at about 600° C. for about 2 hours.

Thermal and/or chemical treatments are performed at any suitable temperature and for any suitable time. In some instances, higher temperature treatments produce nanofibers of a smaller diameter.

In some embodiments, thermal treatment is performed at about 100° C., about 150° C., about 200° C., about 300° C., about 400° C., about 500° C., about 600° C., about 700° C., about 800° C., about 900° C., about 1,000° C., about 1,500° C., about 2,000° C., and the like. In some embodiments, thermal treatment is performed at a temperature of at least 100° C., at least 150° C., at least 200° C., at least 300° C., at least 400° C., at least 500° C., at least 600° C., at least 700° C., at least 800° C., at least 900° C., at least 1,000° C., at least 1,500° C., at least 2,000° C., and the like. In some embodiments, heating is performed at a temperature of at most 100° C., at most 150° C., at most 200° C., at most 300° C., at most 400° C., at most 500° C., at most 600° C., at most 700° C., at most 800° C., at most 900° C., at most 1,000° C., at most 1,500° C., at most 2,000° C., and the like. In some embodiments, heating is performed at a temperature of between about 300° C. and 800° C., between about 400° C. and 700° C., between about 500° C. and 900° C., between about 700° C. and 900° C., between about 800° C. and 1,200° C., and the like.

Heating is performed at a constant temperature, or the temperature is changed over time. In some embodiments, the rate of temperature increase is between about 0.1° C./min and 10° C./min, between about 0.5° C./min and 2° C./min, between about 2° C./min and 10° C./min, between about 0.1° C./min and 2° C./min, or the like.

Heating is performed for any suitable amount of time necessary to arrive at a nanofiber with the desired properties. In some embodiments, heating is performed for at least 5 minutes, at least 15 minutes, at least 30 minutes, at least 1 hour, at least 2 hours, at least 3 hours, at least 4 hours, at least 8 hours, at least 12 hours, at least 1 day, at least 2 days, and the like.

System

In one aspect, described herein is a lithium ion battery system, the system comprising: (a) an electrolyte; (b) an anode in a first chamber; (c) a cathode in a second chamber, the cathode comprising a plurality of lithium containing nanofibers; and (d) a separator between the first chamber and the second chamber, and the separator allowing lithium ion transport between the first chamber and second chamber (e.g., in a temperature dependent manner).

In one aspect, described herein is a system for producing nanofibers for a lithium ion battery, the system comprising: (a) a fluid stock comprising a polymer and inorganic precursors or nanoparticles; (b) an electrospinner suitable for electrospinning the fluid stock into nanofibers; (c) a heater suitable for heating the nanofibers; and (d) optionally a module suitable for contacting the nanofibers with an acid.

In some embodiments, electrospinning (e.g., with an aid of gas stream) allows for the high throughput generation of nanomaterials with the ability to control this crystal structure. In some embodiments, purely inorganic or organic/inorganic hybrid nanofibers are generated by inclusion of various metal/ceramic precursors (metal nitrate, acetate, acetylacetonate, etc.) or preformed nanoparticles (e.g., a lithium material described herein) within a polymer (PVA, PAN, PEO, etc.) solution, as shown in the schematic in FIG. 1. In some embodiments, thermal treatment is used to carbonize polymers, remove polymers, selectively remove a single polymer phase, and/or crystallize and/or calcine included precursors or nanoparticles with controlled oxidation state. In some embodiments, porosity in the nanofibers is controlled by the removal of a polymer domain during thermal treatment, as demonstrated in FIG. 3 for porous $LiCoO_2$ nanofiber for cathode application. In some instances, this allows for greater surface area to volume ratio and/or greater electrolyte contact increasing ion transfer, while accommodating volume expansion during lithiation and de-lithiation processes.

FIG. 1 illustrates a process according to certain embodiments described herein. In some embodiments, a fluid stock 1003 is prepared by preparing by combining 1002 a fluid (e.g., water, alcohol, or dimethylformamide (DMF)), a polymer and a lithium component 1001 (e.g., lithium precursors and additional metal precursor(s) and/or lithium containing nanoparticles). In some embodiments, a homogenous fluid stock with a viscosity suitable for electrospinning is prepared 1004 by heating and/or mixing the combination. In certain embodiments, the fluid stock is then electrospun from a needle apparatus 1006 (optionally via gas assisted, such as coaxially gas assisted, electrospinning), e.g., using a syringe 1005. In some embodiments, the nanofibers 1008 are collected on a collector 1007 and optionally thermally treated 1009 to provide lithium-containing nanofibers 1010 described herein. In some embodiments, thermal treatment of the as-spun nanofibers carbonizes and/or removes (e.g., via carbonization and subsequent conversion to $CO_2$). In further or alternative embodiments, thermal treatment calcines metal precursor materials to provide a metal component (e.g., metals, metal oxides, metal phosphates, metal sulfides, metal silicates, metal borates, or the like (e.g., depending on what, if any, calcination reagents are utilized)). In some embodiments, calcination of the metal precursors provides a crystalline metal component (e.g., metal, metal oxide, etc.).

Certain Definitions

The articles "a", "an" and "the" are non-limiting. For example, "the method" includes the broadest definition of the meaning of the phrase, which can be more than one method.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

EXAMPLES

Example 1: Nanofiber Having a Continuous Core Matrix of a Lithium (Metal Oxide)-Containing-Material A first composition is prepared by combining 0.5 g PVA (79 kDa, 88% hydrolyzed) with 4.5 g water. The first composition is heated to 95 C for at least 8 hours. A second composition is prepared by combining 1 g water, 0.5 g acetic acid, 3 drops x-100 surfactant, lithium acetate (hydrate) and one or more metal precursor (e.g., cobalt acetate (hydrate), manganese acetate (hydrate), nickel acetate (hydrate)). The second composition is mixed for at least 4 hours. The first and second compositions are combined and mixed for at least 2 hours to form a fluid stock.

The fluid stock is electrospun in a coaxial gas assisted manner, using a flow rate of 0.01 mL/min, a voltage of 20 kV and a tip to collector distance of 15 cm. The fluid stock is also electrospun without coaxial gas assistance, using a flow rate of 0.005 mL/min, a voltage of 20 kV and a tip to collector distance of 18 cm. Electrospinning of the fluid stock prepares an as-spun precursor nanofiber, which is subsequently thermally treated.

A one step thermal treatment procedure involves treating the as-spun nanofibers in air at about 700 C (with a heat/cool rate of 2 C/min) for 5 hours. A two step thermal treatment procedure involves a first thermal treatment under argon at about 700 C (with a heat/cool rate of 2 C/min) for 5 hours, and a second thermal treatment under air at about 500 C (with a heat/cool rate of 2 C/min).

For all examples, X-Ray diffraction (XRD) done using Scintag 2-theta diffractometer; scanning electron microscopy (SEM) with Leica 440 SEM; transmission electron microscopy (TEM) with FEI Spirit TEM.

Example 2: $LiCoO_2$ Nanofibers

Using a gas assisted procedure of Example 1, wherein cobalt acetate is utilized as the metal precursor, lithium cobalt oxide nanofibers are prepared. Nanofibers are prepared using 1:1, 1:1.5, and 1:2 molar ratios of cobalt acetate-to-lithium acetate.

Figure 2:
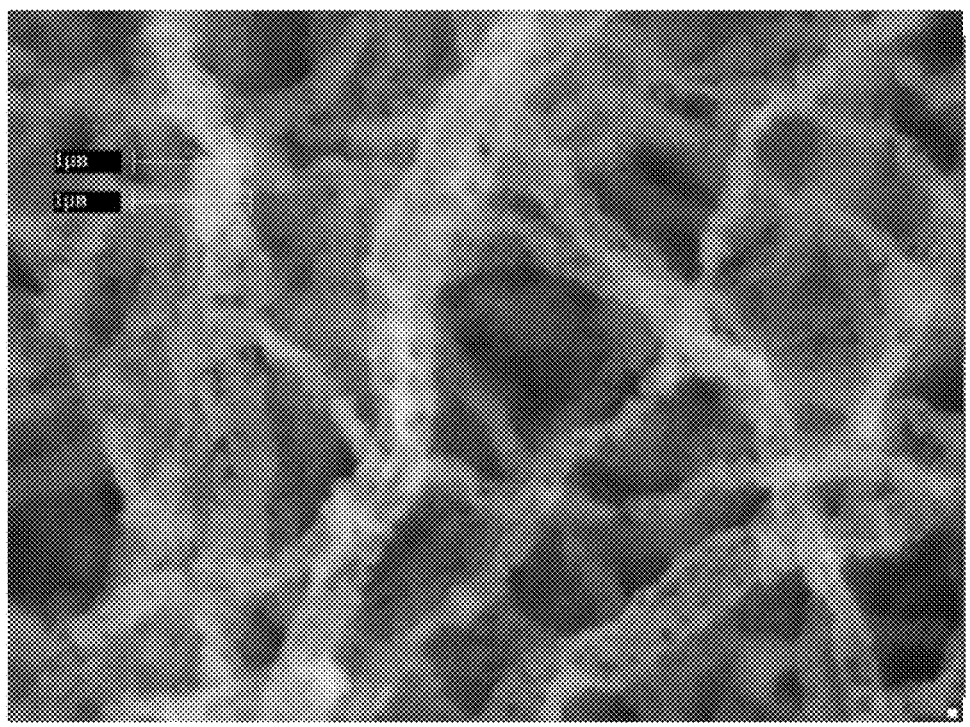
FIG. 2 shows a TEM image of $LiCoO_2$ nanofibers from electrospinning of aqueous solution of PVA/Li-Ac/Co—Ac followed by thermal treatment at 800° C. under air.
Figure 2:
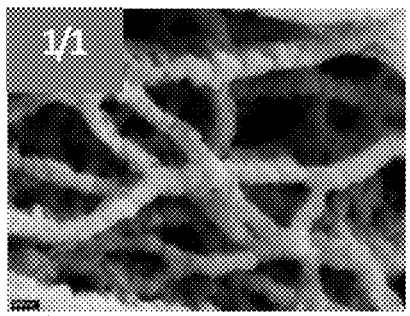
Figure 2:
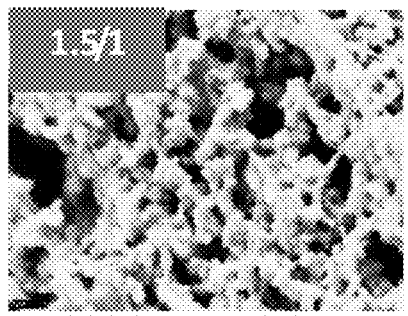
Figure 2:
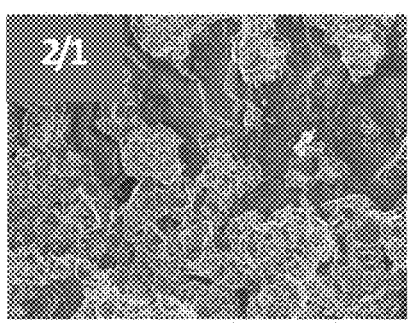
Figure 2:
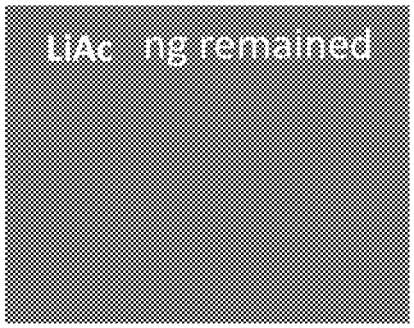
Figure 3:
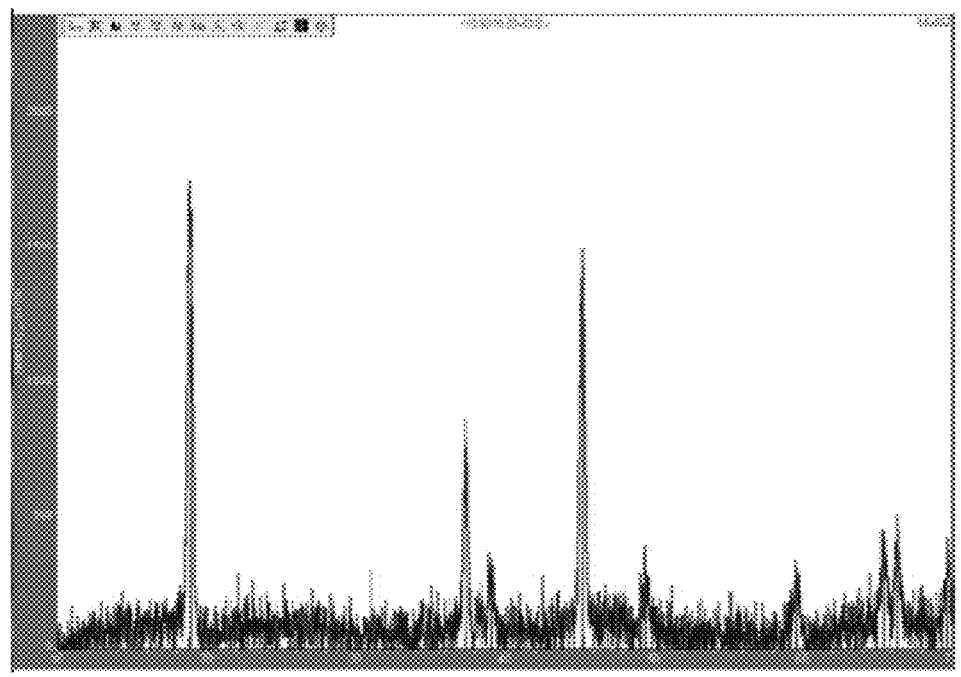
FIG. 3 shows an XRD spectra of $LiCoO_2$ nanofibers from electrospinning of aqueous solution of PVA/Li-Ac/Co—Ac followed by thermal treatment at 800° C. under air, confirming the formation of nanocrystals $LiCoO_2$.
Figure 3:
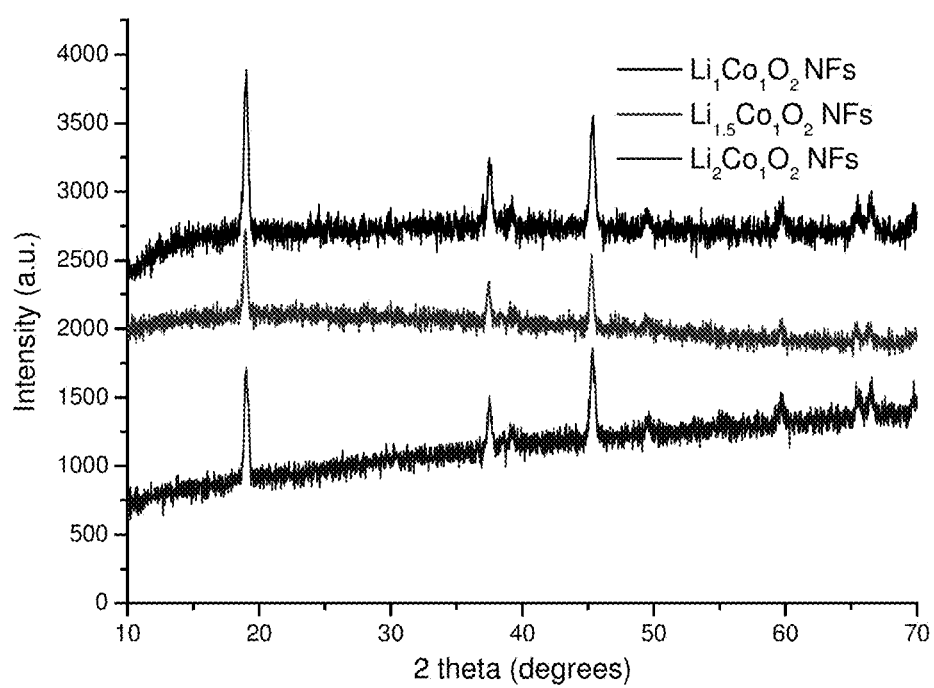
Figure 4:
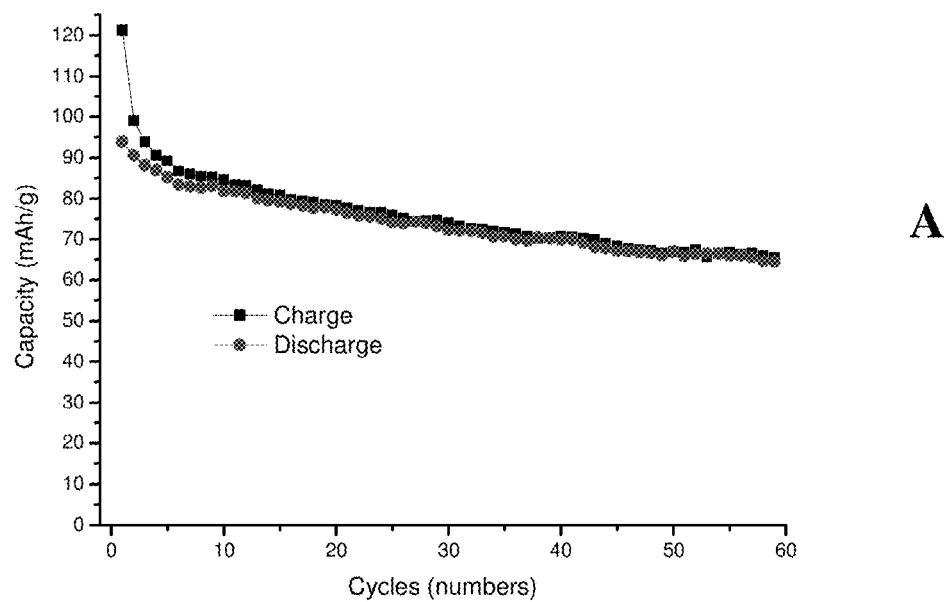
FIG. 4 illustrates the charge/discharge capacities for lithium cobalt oxide prepared using a one step thermal process (panel A) and a two step thermal process (panel B).
Figure 4:
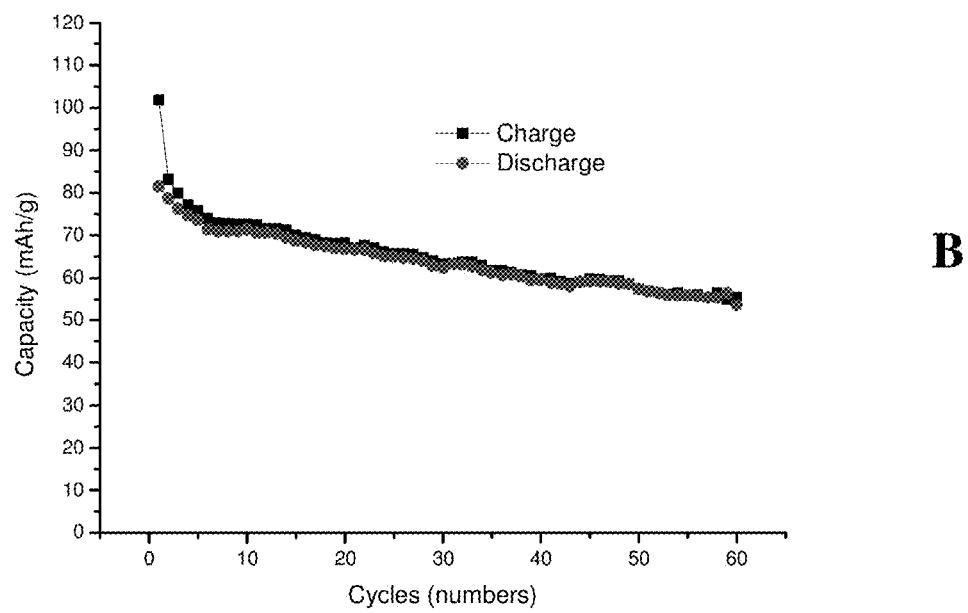

FIG. 2 illustrates an SEM image of such nanofibers (panel A). FIG. 2 (panel B) also illustrates SEM images such nanofibers prepared using 1:1, 1:1.5, and 1:2 molar ratios of cobalt acetate-to-lithium acetate (ratios in the figure are inverted). FIG. 3 (panel A) illustrates the XRD pattern for the lithium cobalt oxide nanofibers and illustrates the XRD pattern (panel B) for nanofibers prepared using 1:1, 1:1.5, and 1:2 molar ratios of cobalt acetate-to-lithium acetate (ratios in the figure are inverted). FIG. 4 illustrates the charge/discharge capacities for lithium cobalt oxide prepared using a one step thermal process (panel A) and a two step thermal process (panel B). The lithium cobalt oxide nanofibers produced is observed to have an initial capacity of about 120 mAh/g at 0.1 C.

Table 1 illustrates charge capacities determined using the various lithium-metal ratios and the one and two step thermal treatment processes.

TABLE 1

| Li:Co (ratio for stock) | Thermal Treatment | Charge capacity (mAh/g) |
|---|---|---|
| 1:1 | 700 C./air | N/A |
| 1.5:1 | 700 C./air | 67 |
| 2:1 | 700 C./air | 89 |
| 2:1 | 1. 700 C./Ar  2. 300 C./air | 50 |
| 2:1 | 1. 700 C./Ar  2. 700 C./air | 110 |

Example 3: $Li(Ni_xCo_yMn_z)O_2$ Nanofibers

Figure 5:
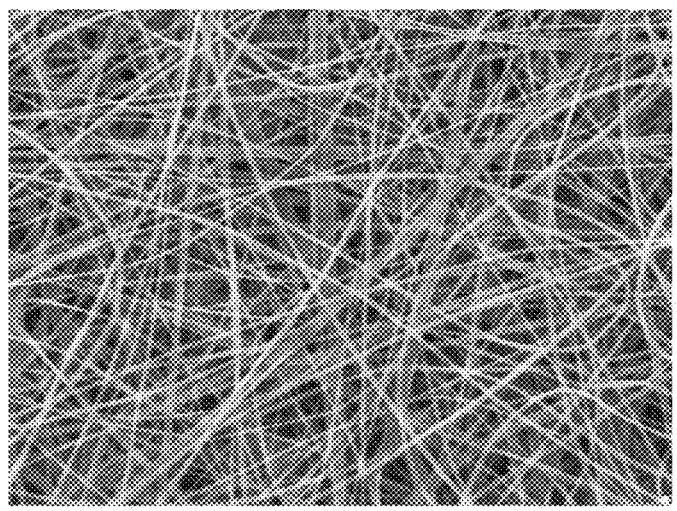
FIG. 5 illustrates (panel B) an SEM image of certain $Li(Ni_{1/3}Co_{1/3}Mn_{1/3})O_2$ nanofibers (i.e., nanofibers comprising a continuous core matrix, or backbone, of $Li(Ni_{1/3}Co_{1/3}Mn_{1/3})O_2$), as well as as-spun precursor nanofibers used to prepare the same (panel A).
Figure 5:
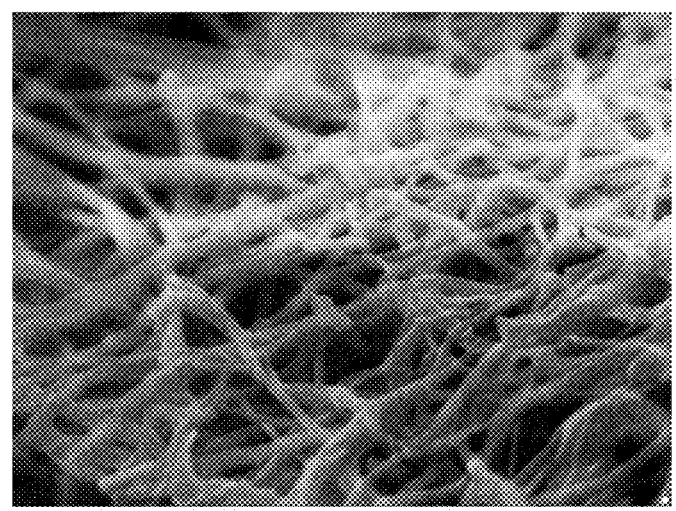
Figure 5:
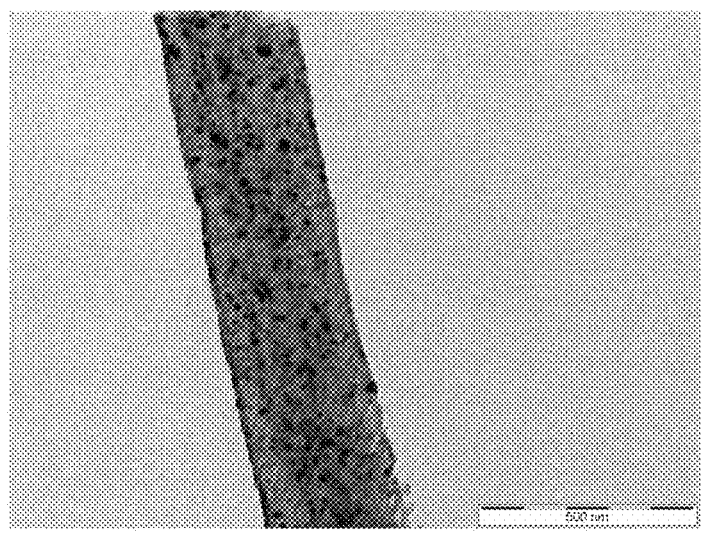
Figure 6:
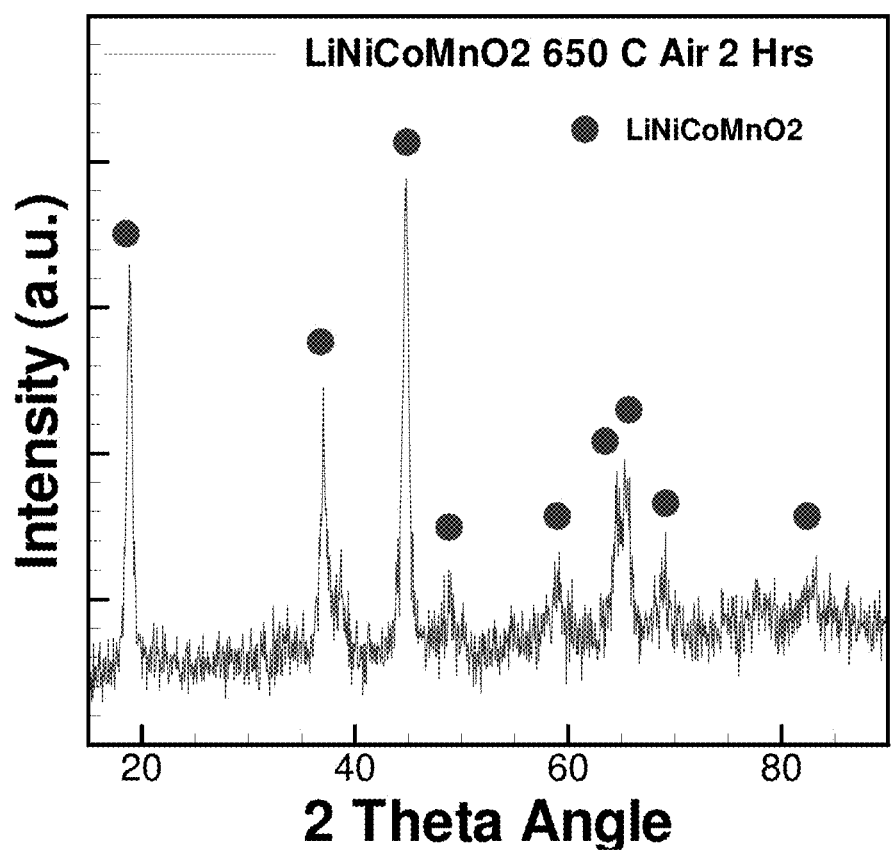
FIG. 6 illustrates an XRD pattern for certain $Li(Ni_{1/3}Co_{1/3}Mn_{1/3})O_2$ nanofibers.
Figure 7:
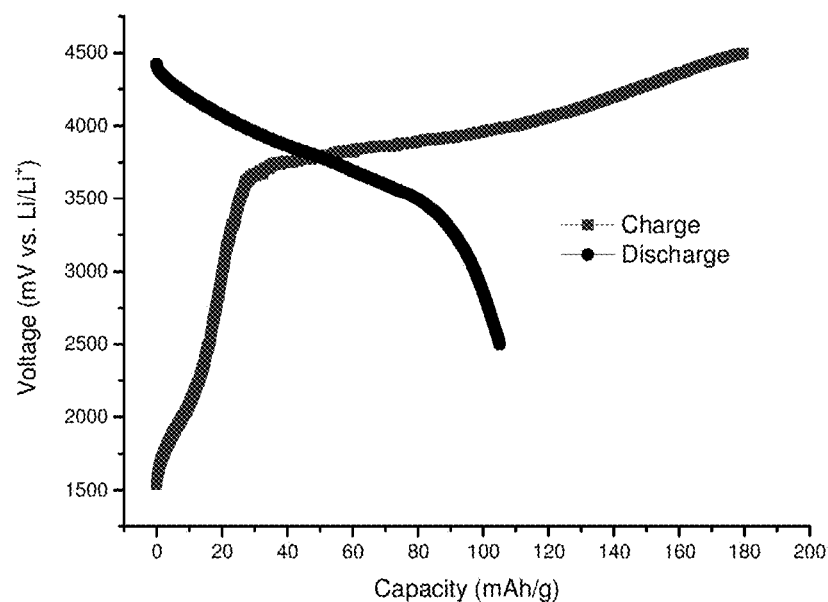
FIG. 7 illustrates charge/discharge capacities for certain $Li(Ni_{1/3}Co_{1/3}Mn_{1/3})O_2$ nanofibers in a lithium ion battery half cell.

Using a gas assisted procedure of Example 1, wherein nickel acetate, cobalt acetate, and manganese acetate are utilized as the metal precursor, $Li_a(Ni_xCo_yMn_z)O_2$ nanofibers are prepared. Nanofibers are prepared using 1:1, 1:1.5, and 1:2 molar ratios of the combined nickel/cobalt/manganese acetate-to-lithium acetate. Various molar ratios of nickel acetate (x) to cobalt acetate (y) to manganese acetate (z) are utilized FIG. 5 (panel A) illustrates an SEM image of as-spun nanofibers prepared using a 1:1:1 ratio of x:y:z. Panel B illustrates an SEM image of thermally treated ($Li(Ni_{1/3}Co_{1/3}Mn_{1/3})O_2$) nanofibers (treated at 650 C in air). Panel C illustrates a TEM image of the thermally treated nanofibers. FIG. 6 illustrates the XRD pattern for the thermally treated nanofibers. FIG. 7 illustrates the charge/discharge capacities for 1:1:1 (x:y:z) nanofibers prepared. The nanofibers produced is observed to have an initial capacity of about 180 mAh/g at 0.1 C.

Figure 8:
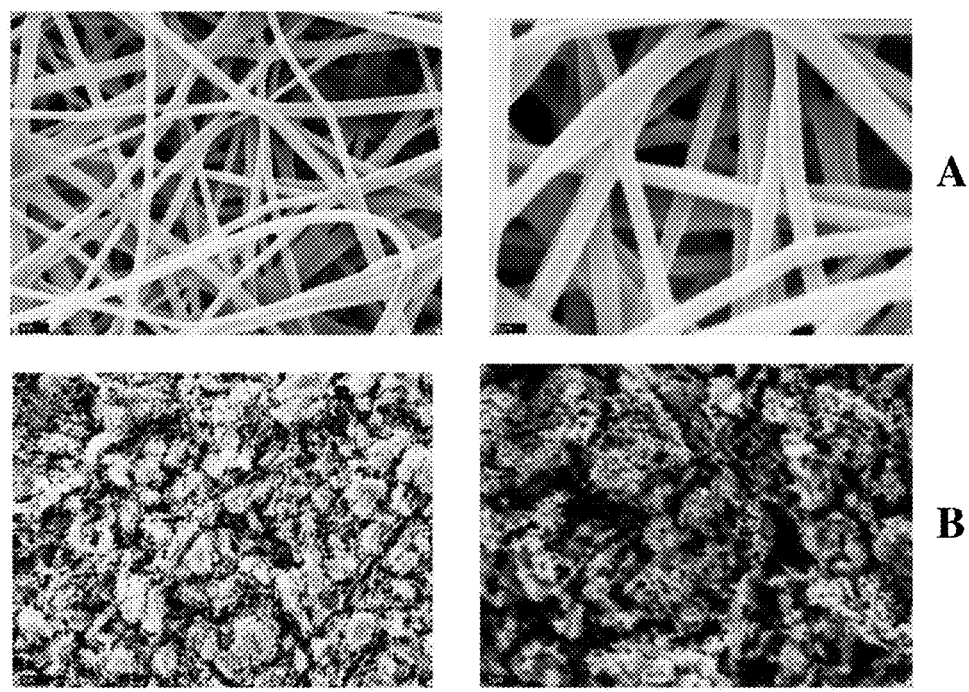
FIG. 8 illustrates (panel B) an SEM image of certain $Li[Li_{0.2}Mn_{0.56}Ni_{0.16}Co_{0.08}]O_2$ nanofibers (i.e., nanofibers comprising a continuous core matrix, or backbone, of Li[Li$_{0.2}$Mn$_{0.56}$Ni$_{0.16}$Co$_{0.08}$]O$_2$), as well as as-spun precursor nanofibers used to prepare the same (panel A).
Figure 9:
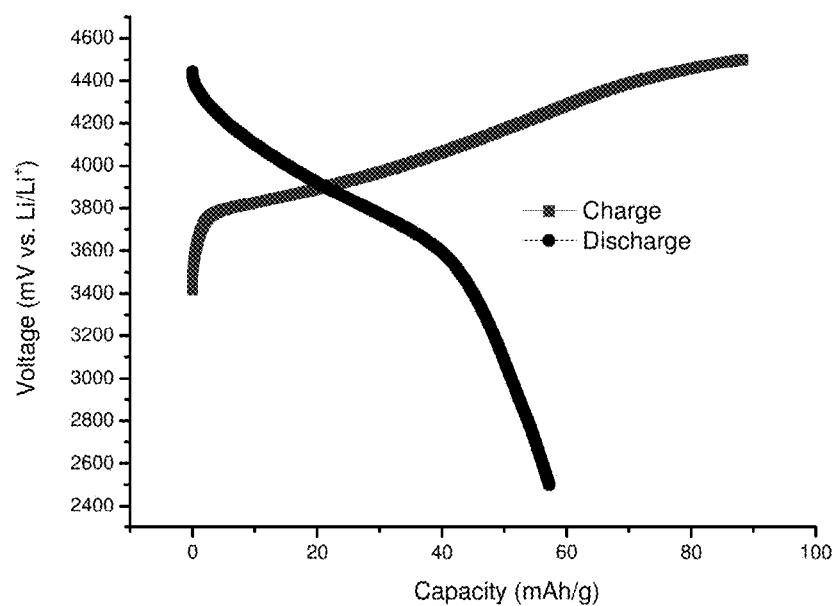
FIG. 9 illustrates charge/discharge capacities for certain Li[Li$_{0.2}$Mn$_{0.56}$Ni$_{0.16}$Co$_{0.08}$]O$_2$ nanofibers.

Using similar procedures, $Li[Li_{0.2}Mn_{0.56}Ni_{0.16}Co_{0.08}]O_2$ nanofibers are also prepared. FIG. 8 illustrates the as-spun and thermally treated (900 C for 5 hours under argon) nanofibers. FIG. 9 illustrates the charge/discharge capacities for nanofibers prepared. The nanofibers produced is observed to have an initial capacity of about 90 mAh/g at 0.1 C.

Figure 10:
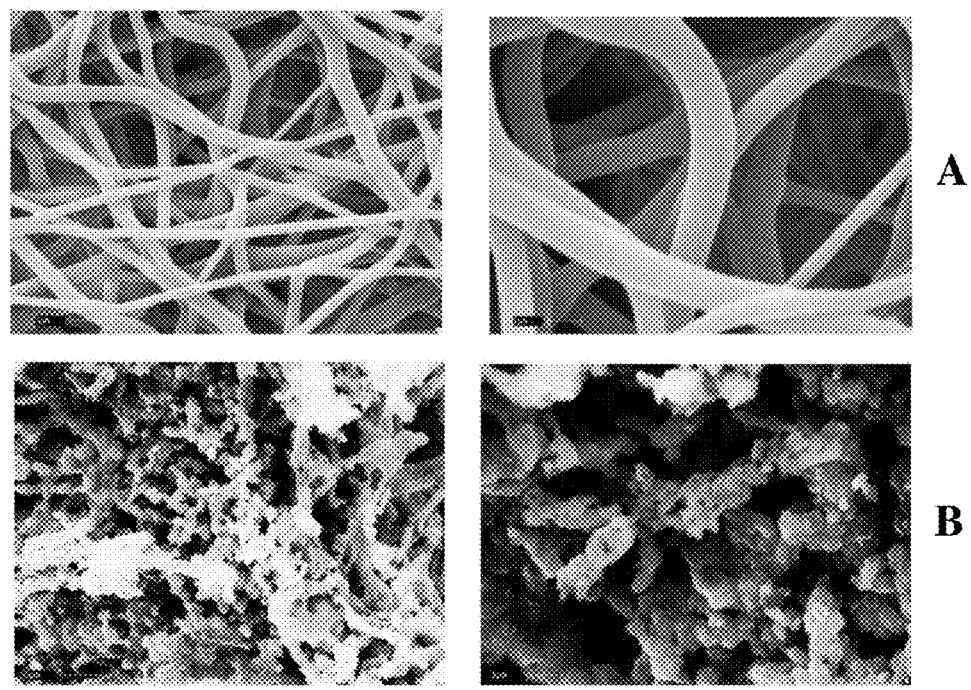
FIG. 10 illustrates (panel B) an SEM image of certain Li$_{0.8}$Mn$_{0.4}$Ni$_{0.4}$Co$_{0.4}$O$_2$ nanofibers (i.e., nanofibers comprising a continuous core matrix, or backbone, of Li$_{0.8}$Mn$_{0.4}$Ni$_{0.4}$Co$_{0.4}$O$_2$), as well as as-spun precursor nanofibers used to prepare the same (panel A).

Using similar procedures, $Li_{0.8}Mn_{0.4}Ni_{0.4}Co_{0.4}O_2$ nanofibers are prepared. FIG. 10 (panel A) illustrates as-spun nanofibers and (panel B) thermally treated (900 C for 5 hours under argon) nanofibers.

Example 4: $LiMn_2O_4$ Nanofibers

Using a gas assisted procedure of Example 1, wherein manganese acetate is utilized as the metal precursor, $LiMn_2O_4$ nanofibers are prepared. Nanofibers are prepared using 2:1, 3:2 (50% excess lithium acetate), and 1:1 (100% excess lithium acetate) molar ratios of the manganese acetate-to-lithium acetate.

Figure 11:
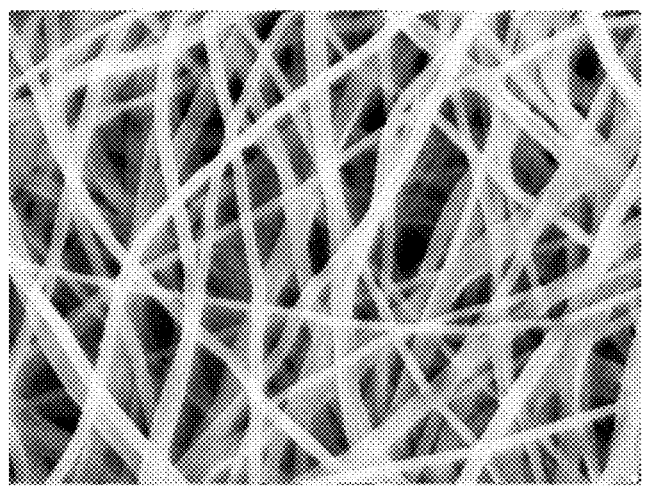
FIG. 11 illustrates (panel B) an SEM image of certain LiMn$_2$O$_4$ nanofibers (i.e., nanofibers comprising a continuous core matrix, or backbone, of LiMn$_2$O$_4$), as well as as-spun precursor nanofibers used to prepare the same (panel A). Panel C illustrates a TEM image of certain LiMn$_2$O$_4$ nanofibers.
Figure 11:
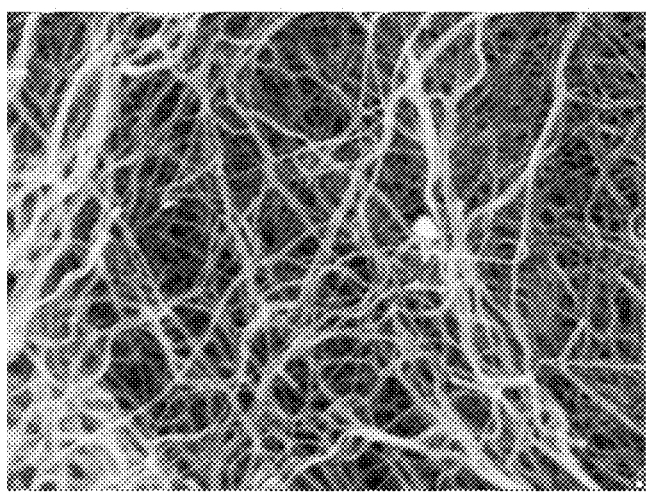
Figure 11:
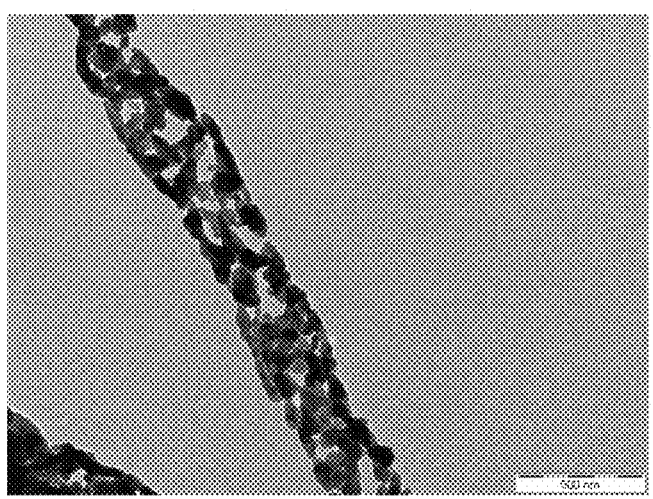
Figure 12:
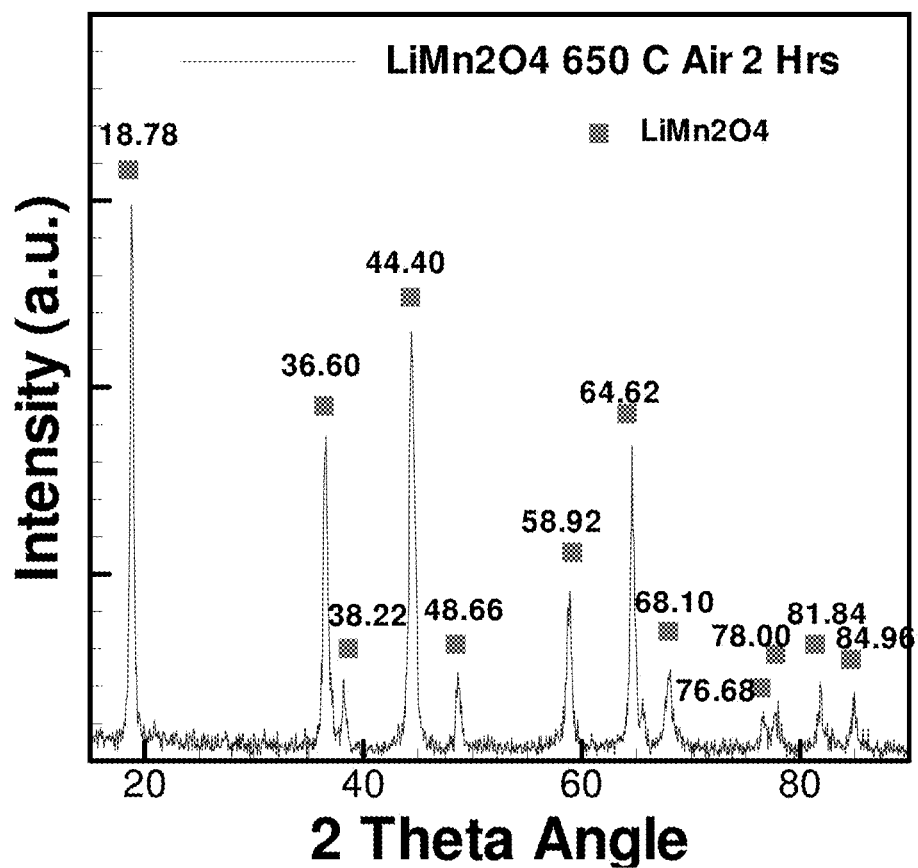
FIG. 12 illustrates an XRD pattern for certain LiMn$_2$O$_4$ nanofibers.
Figure 13:
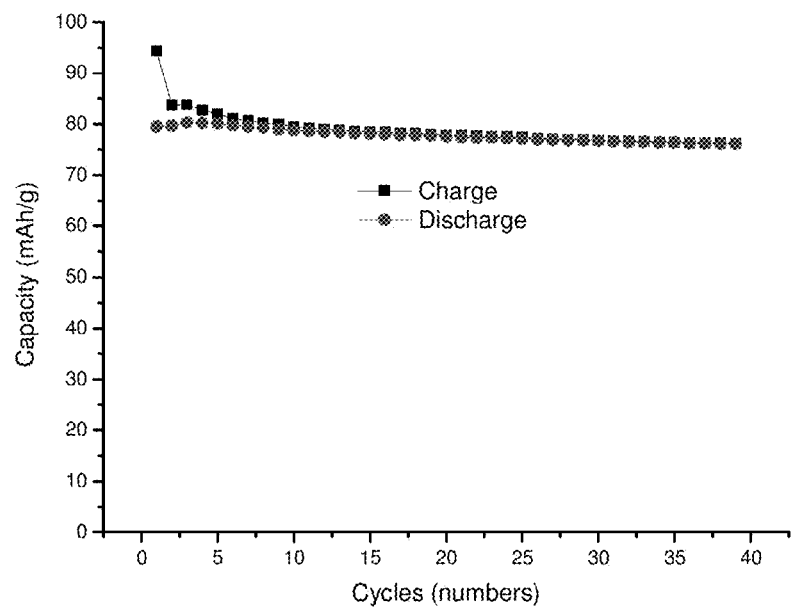
FIG. 13 illustrates charge/discharge capacity for certain LiMn$_2$O$_4$ nanofibers in a lithium ion battery half cell.

FIG. 11 (panel A) illustrates an SEM image of as-spun nanofibers. Panel B illustrates an SEM image of thermally treated nanofibers (treated at 650 C in air). Panel C illustrates a TEM image of the thermally treated nanofibers. FIG. 12 illustrates the XRD pattern for the thermally treated nanofibers. FIG. 13 illustrates the charge/discharge capacity of the nanofibers for about 40 cycles. The lithium manganese oxide nanofibers produced is observed to have an initial capacity of about 95 mAh/g at 0.1 C.

Example 5: $Li(Ni_xMn_z)O_4$ Nanofibers

Figure 14:
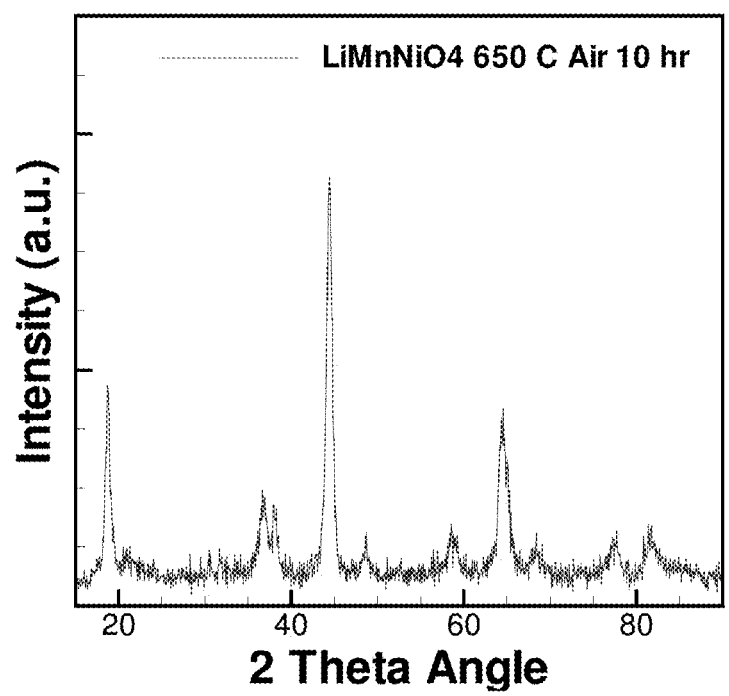
FIG. 14 illustrates an XRD pattern for certain LiMn$_2$O$_4$ nanofibers doped with nickel Li(Ni$_x$Mn$_z$)O$_4$.

Using a gas assisted procedure of Example 1, wherein nickel acetate and manganese acetate are utilized as the metal precursor, $Li(Ni_xMn_z)O_4$ nanofibers are prepared. Nanofibers are prepared using 2:1, 3:2, and 1:1 molar ratios of the combined nickel/manganese acetate-to-lithium acetate. Various molar ratios of nickel acetate (x) to manganese acetate (z) are utilized (e.g., 1:3 for $Li(Ni_{0.5}Mn_{1.5})O_4$). FIG. 14 illustrates the XRD pattern for the thermally treated nanofibers.

Example 6: Nanofiber Having a Continuous Core Matrix of a Lithium (Metal Phosphate)-Containing-Material A first composition is prepared by combining 0.5 g PVA (79 kDa, 88% hydrolyzed) with 4.5 g water. The first composition is heated to 95 C for at least 8 hours. A second composition is prepared by combining 1 g water, 0.5 g acetic acid, 3 drops x-100 surfactant, lithium acetate (hydrate), one or more metal precursor (e.g., iron acetate (hydrate), cobalt acetate (hydrate), manganese acetate (hydrate), nickel acetate (hydrate)), and a phosphorus precursor (e.g., triethylphosphite). The second composition is mixed for at least 4 hours. The first and second compositions are combined and mixed for at least 2 hours to form a fluid stock.

The fluid stock is electrospun in a coaxial gas assisted manner, using a flow rate of 0.01 mL/min, a voltage of 20 kV and a tip to collector distance of 15 cm. The fluid stock is also electrospun without coaxial gas assistance, using a flow rate of 0.005 mL/min, a voltage of 20 kV and a tip to collector distance of 18 cm. Electrospinning of the fluid stock prepares an as-spun precursor nanofiber, which is subsequently thermally treated.

A one step thermal treatment procedure involves treating the as-spun nanofibers in air at about 700 C (with a heat/cool rate of 2 C/min) for 5 hours. A two step thermal treatment procedure involves a first thermal treatment under argon at about 700 C (with a heat/cool rate of 2 C/min) for 5 hours, and a second thermal treatment under air at about 500 C (with a heat/cool rate of 2 C/min).

Example 7: $LiFePO_4$ Nanofibers

Using a gas assisted procedure of Example 6, wherein iron acetate is utilized as the metal precursor, lithium iron phosphate nanofibers are prepared. Nanofibers are prepared using 1:1, 1:1.5, and 1:2 molar ratios of iron acetate-to-lithium acetate.

Figure 15:
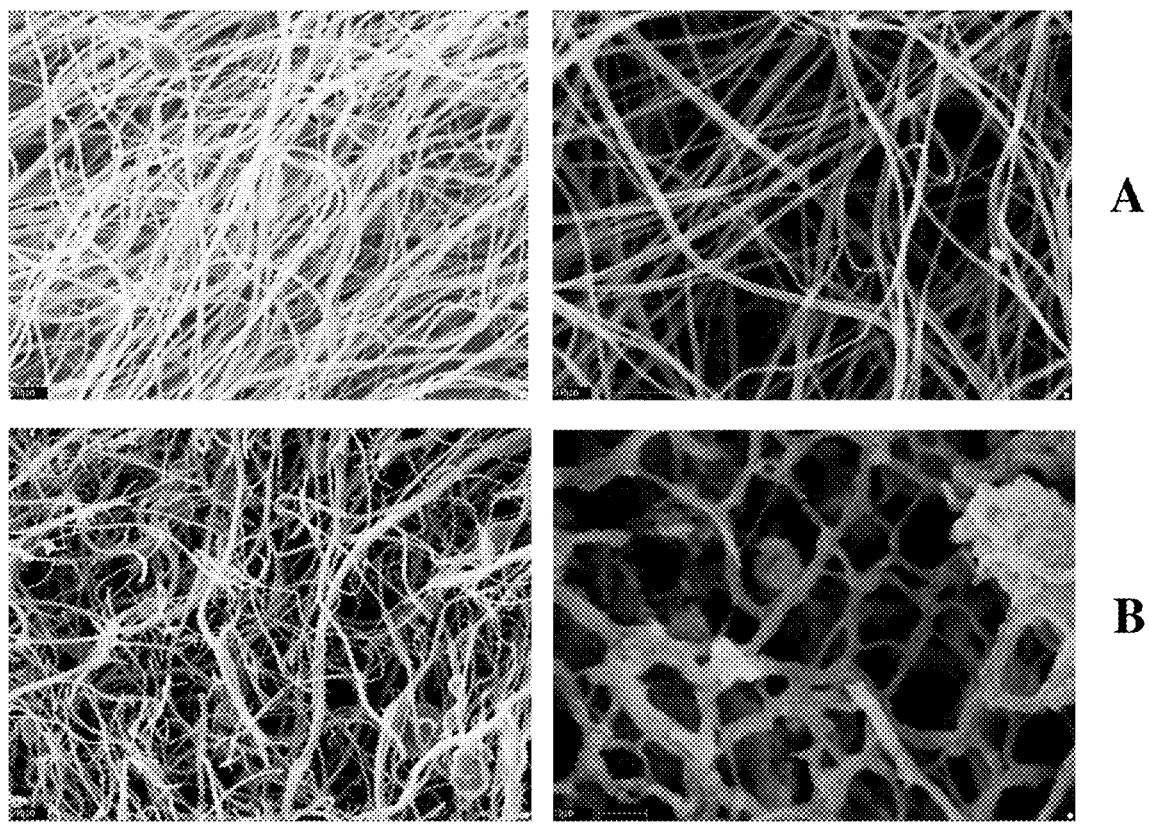
FIG. 15 illustrates (panel B) an SEM image of certain lithium iron phosphate nanofibers (i.e., nanofibers comprising a continuous core matrix, or backbone, of lithium iron phosphate), as well as as-spun precursor nanofibers used to prepare the same (panel A).
Figure 16:
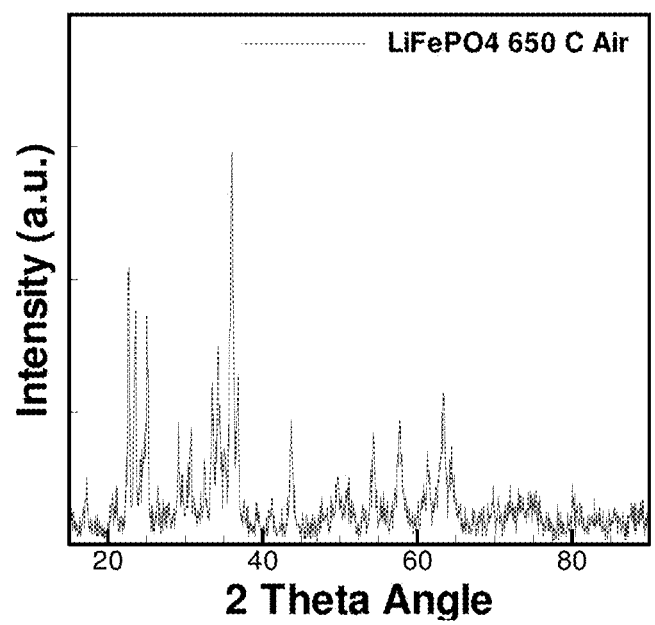
FIG. 16 illustrates an XRD pattern for certain lithium iron phosphate nanofibers.

FIG. 15 illustrates an SEM image of the as-spun nanofibers (panel A) and thermally treated nanofibers (panel B). FIG. 16 illustrates the XRD pattern for the lithium iron phosphate nanofibers.

Example 8: Nanofiber Having a Continuous Core Matrix of a Lithium (Sulfide/Sulfate)-Containing-Material A first composition is prepared by combining 0.5 g PVA (79 kDa, 88% hydrolyzed) with 4.5 g water. The first composition is heated to 95 C for at least 8 hours. A second composition is prepared by combining 1 g water, 0.5 g acetic acid, 3 drops x-100 surfactant, lithium acetate (hydrate), and a sulfur precursor (e.g., elemental sulfur, such as sulfur nanoparticles). The second composition is mixed for at least 4 hours. The first and second compositions are combined and mixed for at least 2 hours to form a fluid stock.

The fluid stock is electrospun in a coaxial gas assisted manner, using a flow rate of 0.01 mL/min, a voltage of 20 kV and a tip to collector distance of 15 cm. The fluid stock is also electrospun without coaxial gas assistance, using a flow rate of 0.005 mL/min, a voltage of 20 kV and a tip to collector distance of 18 cm. Electrospinning of the fluid stock prepares an as-spun precursor nanofiber, which is subsequently thermally treated.

Figure 17:
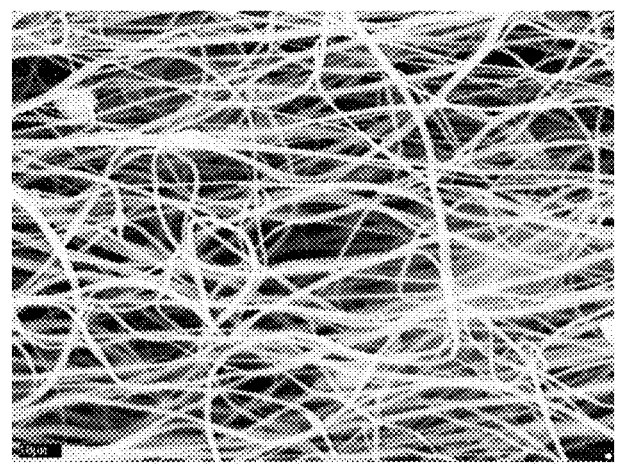
FIG. 17 illustrates an SEM image of certain Li$_2$S/C nanofibers, as well as as-spun precursor nanofibers used to prepare the same (panel A).
Figure 17:
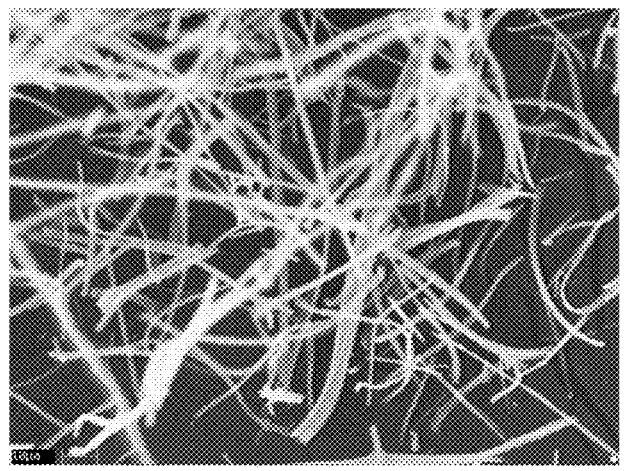
Figure 17:
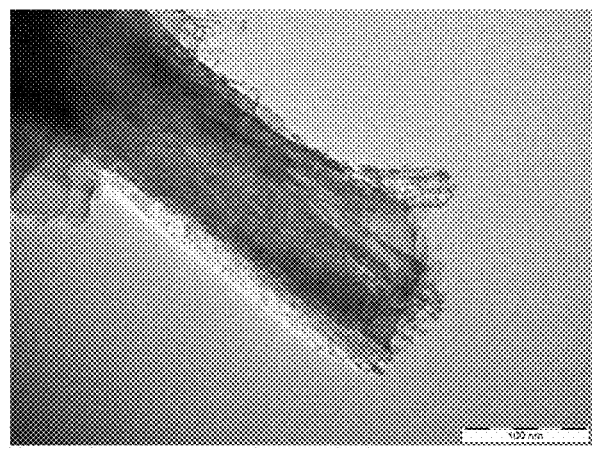
Figure 18:
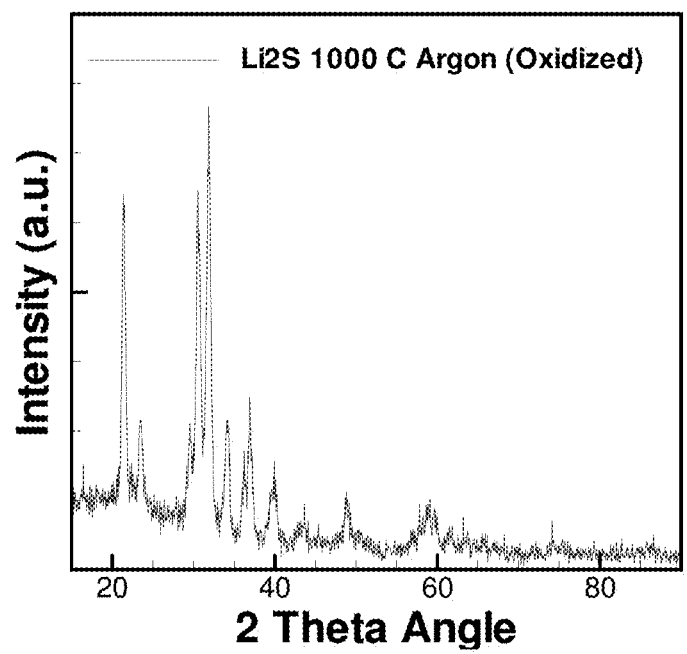
FIG. 18 illustrates an XRD pattern for certain Li$_2$SO$_4$/C nanofibers.

The thermal treatment occurs under argon at about 1000 C (with a heat/cool rate of 2 C/min) for 5 hours for preparation of lithium sulfide containing fibers ($Li_2S$/Carbon nanocomposites). Subsequent air oxidation provides lithium sulfate containing fibers ($Li_2SO_4$/Carbon nanocomposites). FIG. 17 illustrates an SEM image of the as-spun nanofibers (panel A) and thermally treated nanofibers (panel B). Panel C illustrates a TEM image of the thermally treated nanofibers. FIG. 18 illustrates the XRD pattern for the oxidized nanofibers.

For fabricating the half cells, Li metal is used as a counter electrode and polyethylene (ca. 25 um thickness) is inserted as a separator between working electrode and counter electrode. The mass of working electrode is 3~4 mg/cm$^2$. The coin cell-typed Li-ion batteries are assembled in Ar-filled glove box with electrolyte. The cut off voltage during the galvanostatic tests is 0.01~2.0 V for anode and 2.5~4.2 V by using battery charge/discharge cyclers from MTI.

What is claimed is:

1. A process for producing a nanofiber comprising a backbone of a lithium-containing-material, the process comprising:
   a. gas-assisted electrospinning a fluid stock to produce a nanofiber, the fluid stock comprising a combination of (i) polymer, and (ii) a metal precursor, the metal precursor comprising lithium, and wherein the metal precursor is combined in the fluid stock in a metal precursor-to-polymer weight ratio of at least 1:4, and (iii) a calcination reagent selected from a phosphorus reagent, a sulfur reagent, a boron reagent, an elemental material, or has a formula of $X^1R^1_q$, wherein $X^1$ is a non-metal or metalloid such as S, P, N, B, Si, or Se, and wherein $R^1$ is H, halo, CN, OH (or O—), $NO_2$, $NH_2$, —NH(alkyl) or —N(alkyl)(alkyl), —$SO_2$alkyl, —$CO_2$-alkyl, alkyl, heteroalkyl, alkoxy, —S-alkyl, cycloalkyl, heterocycle, aryl, heteroaryl, oxide (=O), and wherein q is a value of 0 to 10; and
   b. thermally treating the nanofiber to produce a lithium-containing nanofiber comprising a backbone comprising a lithium-containing-material.

2. The process of claim 1, wherein the metal precursor further comprises a nickel precursor, a cobalt precursor, a manganese precursor, or a combination thereof, and the lithium-containing-material having formula (I):

$$Li_aM_bX_c \quad (I)$$

wherein
M is Ni, Co, Mn, or a combination thereof
X is O;
a is 1-2;
b is 0-2; and
c is 1-4.

3. The process of claim 2, wherein a is 1 and b is 1.

4. The process of claim 2, wherein M is ($Ni_{1/3}Co_{1/3}Mn_{1/3}$).

5. The process of claim 1, wherein the metal precursor is combined in the fluid stock in a metal precursor-to-polymer weight ratio of at least 1:2.

6. The process of claim 5, wherein the metal precursor is present in the fluid stock in a precursor-to-monomeric residue ratio of at least 1:4.

7. The process of claim 1, wherein the metal precursor is present in the fluid stock in concentration of at least 200 mM.

8. The process of claim 7, wherein the metal precursor is present in the fluid stock in concentration of at least 300 mM.

9. The process of claim 7, wherein the metal precursor is present in the fluid stock in concentration of at least 400 mM.

10. The process of claim 1, wherein the polymer comprises a plurality of monomeric residues, the monomeric residues being present in the fluid stock in concentration of at least 100 mM.

11. The process of claim 10, wherein the monomeric residues are present in the fluid stock in concentration of at least 200 mM.

12. The process of claim 1, wherein the polymer is polyacrylonitrile (PAN), polyvinyl alcohol (PVA), polyvinyl pyrrolidone (PVP), or a combination thereof.

13. The process of claim 1, wherein the fluid stock comprises a combination of nickel precursor, cobalt precursor, and manganese precursor.

14. The process of claim 1, wherein the fluid stock comprises a combination of a lithium and non-lithium metal precursor in a lithium to non-lithium metal precursor molar ratio of about 1:1.

15. The process of claim 1, wherein the fluid stock comprises a combination of a lithium and non-lithium metal precursor in a lithium to non-lithium metal precursor molar ratio of greater than 1:1.

16. The process of claim 1, wherein the gas assisted electrospinning of the fluid stock comprises providing a flow of gas along the same or a similar axis as the electrospinning fluid stock.

17. The process of claim 1, wherein the gas assisted electrospinning of the fluid stock comprises providing a flow of gas a similar axis as the electrospinning fluid stock, and the similar axes are within 5 degrees of one another.

18. A process for producing a nanofiber comprising a backbone of a lithium-containing-material, the process comprising:
   a. gas-assisted electrospinning a fluid stock to produce a nanofiber, the fluid stock comprising a combination of (i) polymer, the polymer comprising a plurality of monomeric residues configured to react with the metal precursor or metal precursors upon thermal treatment, (ii) a metal precursor, the metal precursor comprising lithium, wherein the metal precursor is combined in the fluid stock in a metal precursor-to-polymer weight ratio of at least 1:4, and further wherein the metal precursor is present in the fluid stock in a precursor-to-monomeric residue ratio of at least 1:1, and (iii) a calcination reagent selected from a phosphorus reagent, a sulfur reagent, a boron reagent, an elemental material, or has a formula of $X^1R^1_q$, wherein $X^1$ is a non-metal or metalloid such as S, P, N, B, Si, or Se, and wherein $R^1$ is H, halo, CN, OH (or O—), $NO_2$, $NH_2$, —NH(alkyl) or —N(alkyl)(alkyl), —$SO_2$alkyl, —$CO_2$-alkyl, alkyl, heteroalkyl, alkoxy, —S-alkyl, cycloalkyl, heterocycle, aryl, heteroaryl, oxide (=O), and wherein q is a value of 0 to 10, and b. thermally treating the nanofiber to produce a lithium-containing nanofiber comprising a backbone comprising a lithium-containing-material.

* * * * *